United States Patent
Tanaka et al.

(10) Patent No.: US 9,723,304 B2
(45) Date of Patent: Aug. 1, 2017

(54) IMAGE PROCESSING DEVICE AND METHOD

(75) Inventors: Junichi Tanaka, Kanagawa (JP); Yoichi Yagasaki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 459 days.

(21) Appl. No.: 14/005,980

(22) PCT Filed: Mar. 29, 2012

(86) PCT No.: PCT/JP2012/058305
§ 371 (c)(1),
(2), (4) Date: Sep. 18, 2013

(87) PCT Pub. No.: WO2012/137656
PCT Pub. Date: Oct. 11, 2012

(65) Prior Publication Data
US 2014/0016712 A1    Jan. 16, 2014

(30) Foreign Application Priority Data
Apr. 6, 2011 (JP) ................. 2011-084933

(51) Int. Cl.
*H04N 7/12* (2006.01)
*H04N 19/152* (2014.01)
(Continued)

(52) U.S. Cl.
CPC ..... *H04N 19/00193* (2013.01); *H04N 19/115* (2014.11); *H04N 19/15* (2014.11);
(Continued)

(58) Field of Classification Search
None
See application file for complete search history.

(56) References Cited

U.S. PATENT DOCUMENTS

| 7,688,234 B2* | 3/2010 | Koo | ........................ H03M 7/40 341/107 |
| 2003/0053416 A1* | 3/2003 | Ribas-Corbera | ..... H04N 19/172 370/233 |

(Continued)

FOREIGN PATENT DOCUMENTS

| JP | 2003-179665 | 6/2003 |
| JP | 2003-179665 A | 6/2003 |

(Continued)

OTHER PUBLICATIONS

International Search Report issued Jul. 3, 2012 in Application No. PCT/JP2012/058305.

(Continued)

*Primary Examiner* — James M Anderson, II
(74) *Attorney, Agent, or Firm* — Chip Law Group

(57) ABSTRACT

The present technique relates to an image processing device and a method therefor allowing rate control to be performed more easily. An image encoding device that encodes image data to generate an encoded stream includes: a setting unit configured to set binary parameters used for defining the size, the accumulated data amount, and the like of a hypothetical decoder defined in the encoded stream obtained by encoding the image data in binary data generated by arithmetic coding; an encoding unit configured to encode image data to generate an encoded stream; and a transmitting unit configured to transmit the binary parameter set by the setting unit and the encoded stream generated by the encoding unit to an image decoding device that decodes the encoded stream via a predetermined transmission path such as a recording medium or a network. The present disclosure can be applied to image processing devices, for example.

13 Claims, 27 Drawing Sheets

(51) Int. Cl.
  *H04N 19/172* (2014.01)
  *H04N 19/15* (2014.01)
  *H04N 19/115* (2014.01)
  *H04N 19/61* (2014.01)

(52) U.S. Cl.
  CPC ......... *H04N 19/152* (2014.11); *H04N 19/172* (2014.11); *H04N 19/61* (2014.11)

(56) References Cited

U.S. PATENT DOCUMENTS

| | | | |
|---|---|---|---|
| 2004/0184544 A1* | 9/2004 | Kondo | H03M 7/40 375/240.23 |
| 2005/0243930 A1 | 11/2005 | Asano et al. | |
| 2009/0058691 A1 | 3/2009 | Koo | |
| 2009/0304071 A1* | 12/2009 | Shi | H04N 19/176 375/240.02 |
| 2010/0220782 A1 | 9/2010 | Arakawa et al. | |

FOREIGN PATENT DOCUMENTS

| | | |
|---|---|---|
| JP | 2005-318296 | 11/2005 |
| JP | 2005-318296 A | 11/2005 |
| JP | 2007-124122 | 5/2007 |
| JP | 2007-124122 A | 5/2007 |
| JP | 2009-55384 | 3/2009 |
| JP | 2009-055384 A | 3/2009 |
| JP | 2009-111625 | 5/2009 |
| JP | 2009-111625 A | 5/2009 |

OTHER PUBLICATIONS

Sakae Okubo, et al., "Introduction of Virtual Decoder Model: Defined by H.264/AVC Standard", Revised Version H.264/AVC Textbook, Jan. 1, 2009, pp. 185-194 (With English Translation).
Office Action received for Chinese Patent Application No. 201280015617.X, mailed on Apr. 1, 2016, 17 Pages of Office Action Including 10 Pages of English Translation.

* cited by examiner

FIG. 3

HRD parameters syntax

| | C | Descriptor |
|---|---|---|
| hrd_parameters(){ | | |
|   cpb_cnt_minus1 | 0\|5 | ue(v) |
|   bit_rate_scale | 0\|5 | u(4) |
|   cpb_size_scale | 0\|5 | u(4) |
|   for(SchedSelIdx=0; SchedSelIdx<=cpb_cnt_minus1; SchedSelIdx++){ | | |
|     bit_rate_value_minus1[SchedSelIdx] | 0\|5 | ue(v) |
|     cpb_size_value_minus1[SchedSelIdx] | 0\|5 | ue(v) |
|     cbr_flag[SchedSelIdx] | 0\|5 | u(1) |
|   } | | |
|   initial_cpb_removal_delay_length_minus1 | 0\|5 | u(5) |
|   cpb_removal_delay_length_minus1 | 0\|5 | u(5) |
|   dpb_output_delay_length_minus1 | 0\|5 | u(5) |
|   time_offset_length | | |
| } | | |

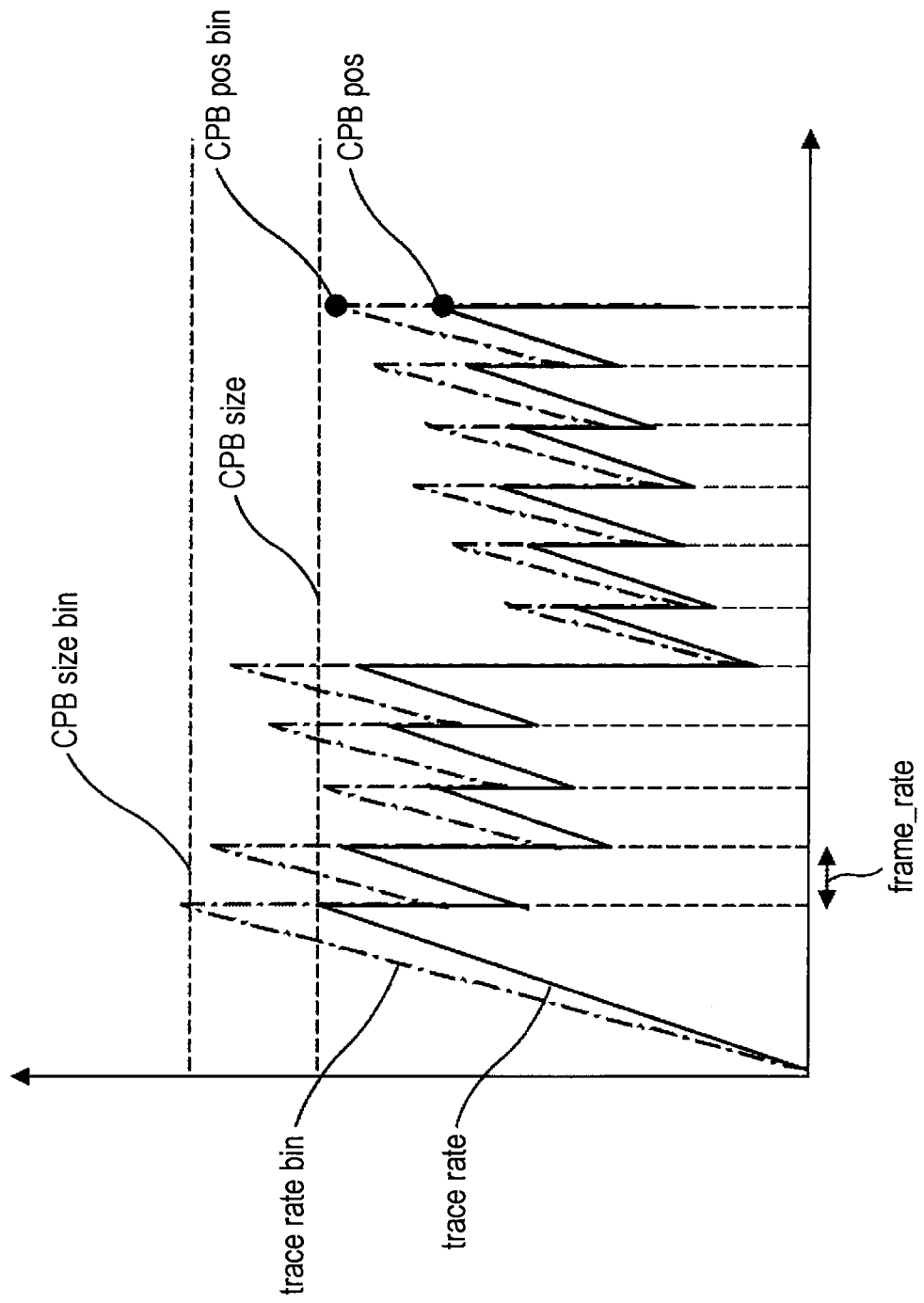

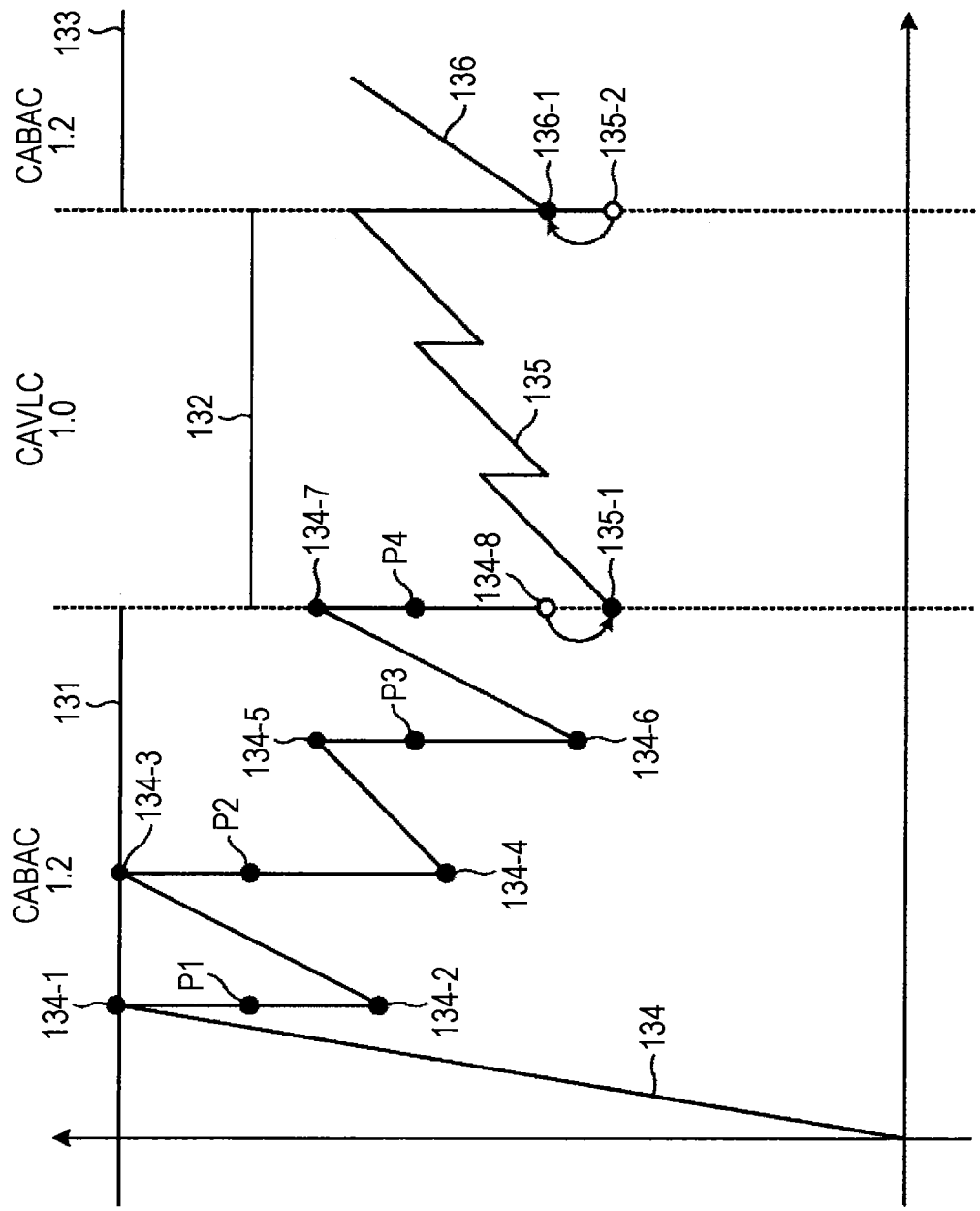

FIG. 8

HRD parameters syntax

| hrd_parameters(){ | C | Descriptor |
|---|---|---|
| cpb_cnt_minus1 | 0\|5 | ue(v) |
| bit_rate_scale | 0\|5 | u(4) |
| cpb_size_scale | 0\|5 | u(4) |
| for(SchedSelIdx=0; SchedSelIdx<=cpb_cnt_minus1; SchedSelIdx++){ | | |
| bit_rate_value_minus1[SchedSelIdx] | 0\|5 | ue(v) |
| cpb_size_value_minus1[SchedSelIdx] | 0\|5 | ue(v) |
| cbr_flag[SchedSelIdx] | 0\|5 | u(1) |
| use_bin_hrd_flag | | |
| use_bin_to_bin_flag | | |
| bit_to_bin | | |
| } | | |
| initial_cpb_removal_delay_length_minus1 | 0\|5 | u(5) |
| cpb_removal_delay_length_minus1 | 0\|5 | u(5) |
| dpb_output_delay_length_minus1 | 0\|5 | u(5) |
| time_offset_length | | |
| } | | |

*FIG. 20*

HRD parameters syntax

| | C | Descriptor |
|---|---|---|
| hrd_parameters(){ | | |
| cpb_cnt_minus1 | 0\|5 | ue(v) |
| bit_rate_scale | 0\|5 | u(4) |
| cpb_size_scale | 0\|5 | u(4) |
| for(SchedSelIdx=0; SchedSelIdx<=cpb_cnt_minus1; SchedSelIdx++){ | | |
| bit_rate_value_minus1[SchedSelIdx] | 0\|5 | ue(v) |
| cpb_size_value_minus1[SchedSelIdx] | 0\|5 | ue(v) |
| cbr_flag[SchedSelIdx] | 0\|5 | u(1) |
| bin_rate | | |
| bin_buffer_size | | |
| } | | |
| initial_cpb_removal_delay_length_minus1 | 0\|5 | u(5) |
| cpb_removal_delay_length_minus1 | 0\|5 | u(5) |
| dpb_output_delay_length_minus1 | 0\|5 | u(5) |
| time_offset_length | | |
| } | | |

IMAGE PROCESSING DEVICE AND METHOD

TECHNICAL FIELD

The present disclosure relates to an image processing device and a method therefor, and more particularly, to an image processing device and a method therefor capable of performing rate control more easily.

BACKGROUND ART

In AVC (Advanced Video Coding) that is an image coding technique, a concept of a hypothetical reference decoder (HRD) is introduced so as to transmit streams without failure (refer, for example, to Non-Patent Document 1). An encoder needs to generate bit streams with the rate controlled so as not to cause failure in a hypothetical decoder.

Various methods are proposed as the method for rate control (refer, for example, to Patent Document 1 and Patent Document 2).

CITATION LIST

Non-Patent Document

Non-Patent Document 1: Sakae OKUBO, Shinya KADONO, Yoshihiro KIKUCHI, Teruhiko SUZUKI, "H.264/AVC Textbook, 3rd Revised Edition," Jan. 1, 2009, IMPRESS R&D, pp. 185-194

Patent Documents

Patent Document 1: JP 2009-55384 A
Patent Document 2: JP 2009-111625 A

SUMMARY OF THE INVENTION

Problems to be Solved by the Invention

Presence of more suitable rate control methods is, however, desired and further studies have been conducted. For example, an easier rate control method is desired.

The present disclosure is made in view of these circumstances, and an object thereof is to allow easier rate control.

Solutions to Problems

One aspect of the present disclosure is an image processing device including: a setting unit configured to set a binary parameter used for defining a hypothetical decoder defined in an encoded stream in binary data; an encoding unit configured to encode image data to generate an encoded stream; and a transmitting unit configured to transmit the binary parameter set by the setting unit and the encoded stream generated by the encoding unit.

The setting unit may set a size of a buffer of the hypothetical decoder and a position representing a data amount of data accumulated in the buffer as the binary parameter.

The setting unit may set a conversion parameter used for converting a code amount of the encoded stream into a data amount of the binary data as the binary parameter.

The setting unit may set as the binary parameter a parameter indicating whether to convert the hypothetical decoder from definition by the encoded stream to definition by binary data by using the conversion parameter.

The setting unit may set as the binary parameter a parameter indicating whether to set a hypothetical decoder defined in the encoded stream and a hypothetical decoder defined in binary data by using different parameters.

The transmitting unit may transmit the binary parameter as additional information of the encoded stream generated by the encoding unit.

The transmitting unit may transmit the binary parameter by inserting the binary parameter into the encoded stream generated by the encoding unit.

The setting unit may set as the binary parameter a parameter used for defining a hypothetical decoder defining a binary data processing rate.

The setting unit may set as the binary parameter a parameter indicating the binary data processing rate.

The setting unit may set as the binary parameter a parameter indicating a size of a buffer of the hypothetical decoder.

A determining unit configured to determine a target bit that is a target rate of an encoded stream by using a maximum processing amount of the encoded stream and a maximum processing amount of binary data determined according to the binary parameter may further be provided.

The one aspect of the present disclosure is also an image processing method for an image processing device, including: setting a binary parameter used for defining a hypothetical decoder defined in an encoded stream in binary data by a setting unit; encoding image data to generate an encoded stream by an encoding unit; and transmitting the set binary parameter and the generated encoded stream by a transmitting unit.

Another aspect of the present disclosure is an image processing device including: a receiving unit configured to receive a binary parameter used for defining a hypothetical decoder defined in an encoded stream in binary data and an encoded stream obtained by encoding image data; and a decoding unit configured to decode the encoded stream received by the receiving unit by using the binary parameter received by the receiving unit.

The another aspect of the present disclosure is also an image processing method for an image processing device, the method including: receiving a binary parameter used for defining a hypothetical decoder defined in an encoded stream in binary data and an encoded stream obtained by encoding image data by a receiving unit; and decoding the received encoded stream by using the received binary parameter by a decoding unit.

In the one aspect of the present disclosure, a binary parameter used for defining a hypothetical decoder defined in an encoded stream in binary data is set, image data is encoded to generate an encoded stream, and the set binary parameter and the generated encoded stream are transmitted.

In the another aspect of the present disclosure, a binary parameter used for defining a hypothetical decoder defined in an encoded stream in binary data and an encoded stream obtained by encoding image data are received, and the received encoded stream is decoded by using the received binary parameter.

Effects of the Invention

According to the present disclosure, images can be processed. In particular, rate control can be performed more easily.

BRIEF DESCRIPTION OF DRAWINGS

FIG. 3 is a table showing examples of syntax.

FIG. 6 is a graph for comparing examples of definition of an HRD by Bit and definition thereof by Bin.

FIG. 7 is a graph for explaining an example of a state of HRD rate control defined by Bin.

FIG. 8 is a table showing other examples of syntax.

FIG. 20 is a table showing still other examples of syntax.

MODES FOR CARRYING OUT THE INVENTION

Modes for carrying out the present disclosure (hereinafter referred to as the embodiments) will be described below. The description will be made in the following order.
1. First Embodiment (image encoding device)
2. Second Embodiment (image decoding device)
3. Third Embodiment (image encoding device)
4. Fourth Embodiment (personal computer)
5. Fifth Embodiment (television receiver)
6. Sixth Embodiment (portable telephone device)
7. Seventh Embodiment (hard disk recorder)
8. Eighth Embodiment (camera)

1. First Embodiment

[Image Encoding Device]

Figure 1:
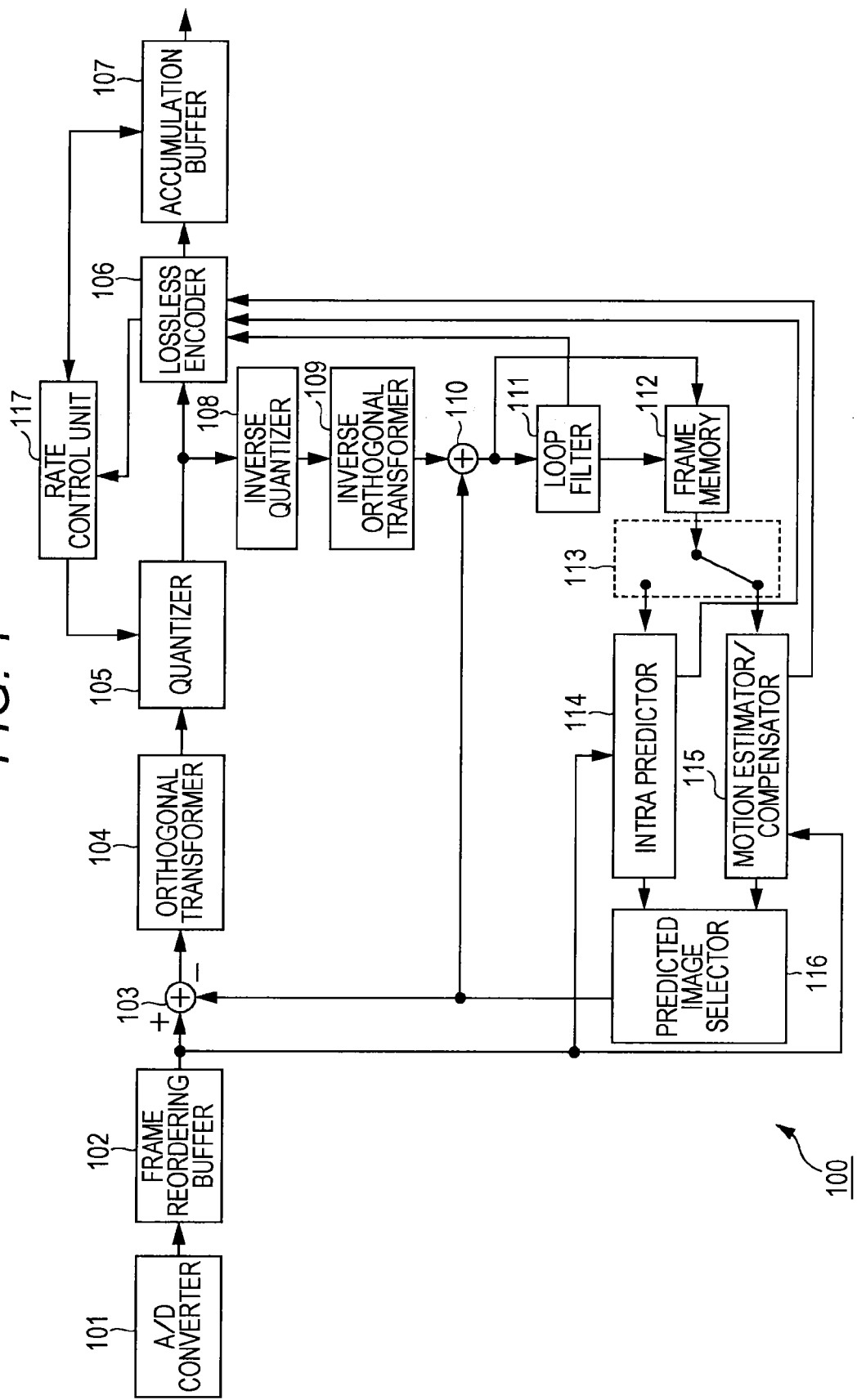
FIG. 1 is a block diagram showing a typical example structure of an image encoding device.

FIG. 1 is a block diagram showing a typical example structure of an image encoding device.

The image encoding device 100 shown in FIG. 1 encodes image data while performing rate control on a code stream so as to transmit the stream without failure as in the H.264 and MPEG (Moving Picture Experts Group) 4 Part 10 (AVC (Advanced Video Coding)) coding techniques.

As shown in FIG. 1, the image encoding device 100 includes an A/D converter 101, a frame reordering buffer 102, an arithmetic operation unit 103, an orthogonal transformer 104, a quantizer 105, a lossless encoder 106, and an accumulation buffer 107. The image encoding device 100 also includes an inverse quantizer 108, an inverse orthogonal transformer 109, an arithmetic operation unit 110, a loop filter 111, a frame memory 112, a selector 113, an intra predictor 114, a motion estimator/compensator 115, a predicted image selector 116, and a rate controller 117.

The A/D converter 101 performs A/D conversion on input image data, supplies the image data (digital data) obtained by the conversion to the frame reordering buffer 102, and stores the image data therein. The frame reordering buffer 102 reorders the frames of the image stored in display order into encoding order in accordance with a GOP (Group of Pictures), and supplies the reordered image to the arithmetic operation unit 103, the intra predictor 114, and the motion estimator/compensator 115.

The arithmetic operation unit 103 subtracts a predicted image supplied from the intra predictor 114 or the motion estimator/compensator 115 via the predicted image selector 116 from an image read from the frame reordering buffer 102, and outputs resulting difference information to the orthogonal transformer 104.

The orthogonal transformer 104 performs orthogonal transform such as discrete cosine transform or Karhunen-Loeve transform on the difference information supplied from the arithmetic operation unit 103, and supplies the resulting information to the quantizer 105. The quantizer 105 quantizes the transform coefficient supplied from the orthogonal transformer 104. The quantizer 105 sets a quantization parameter on the basis of information on a target value of the code amount supplied from the rate controller 117, and performs quantization thereof. Any method may be used for the quantization. The quantizer 105 supplies the quantized transform coefficient to the lossless encoder 106.

The lossless encoder 106 encodes the transform coefficient quantized by the quantizer 105 according to a coding technique. Since the coefficient data is quantized under control of the rate controller 117, the code amount thereof is the target value set by the rate controller 117 (or approximates the target value).

The lossless encoder 106 also acquires information indicating the mode of intra prediction and the like from the intra predictor 114, and acquires information indicating the mode of inter prediction, motion vector information and the like from the motion estimator/compensator 115. The lossless encoder 106 further acquires a filter coefficient used by the loop filter 111, etc.

The lossless encoder 106 encodes these various information pieces according to a coding technique, so that the various information pieces are contained as part of header information of encoded data (multiplexes the information pieces). The lossless encoder 106 supplies the encoded data obtained by the encoding to the accumulation buffer 107 and accumulates the encoded data therein.

Examples of the coding technique used by the lossless encoder 106 include variable-length coding and arithmetic coding. Examples of the variable-length coding include CAVLC (Context-Adaptive Variable Length Coding) defined in the H.264/AVC standard. Examples of the arithmetic coding include CABAC (Context-Adaptive Binary Arithmetic Coding).

The accumulation buffer 107 temporarily holds the encoded data supplied from the lossless encoder 106. The accumulation buffer 107 outputs the held encoded data to a downstream recording device (recording medium), a transmission path, or the like that is not shown.

The transform coefficient quantized by the quantizer 105 is also supplied to the inverse quantizer 108. The inverse quantizer 108 performs inverse quantization on the quantized transform coefficient by a method corresponding to the quantization by the quantizer 105, and supplies the resulting transform coefficient to the inverse orthogonal transformer 109.

The inverse orthogonal transformer 109 performs inverse orthogonal transform on the transform coefficient supplied from the inverse quantizer 108 by a method corresponding to the orthogonal transform process by the orthogonal transformer 104 and the output obtained by the inverse orthogonal transform (restored difference information) is supplied to the arithmetic operation unit 110.

The arithmetic operation unit 110 adds the predicted image supplied from the intra predictor 114 or the motion estimator/compensator 115 via the predicted image selector 116 to the result of the inverse orthogonal transform, that is, the restored difference information supplied from the inverse orthogonal transformer 109 to obtain a locally decoded image (decoded image). The decoded image is supplied to the loop filter 111 and the frame memory 112.

The loop filter 111 includes a deblocking filter, an adaptive loop filter or the like, and performs appropriate filtering on the decoded image supplied from the arithmetic operation unit 110. For example, the loop filter 111 performs deblocking filtering on the decoded image to remove block distortion from the decoded image. In addition, for example, the loop filter 111 performs loop filtering on the result of deblocking filtering (the decoded image from which block distortion is removed) by using a Wiener filter to improve the image quality.

Alternatively, the loop filter 111 may perform certain filtering on the decoded image. The loop filter 111 may also supply information such as a filter coefficient used for the filtering, where necessary, to the lossless encoder 106, so that the information will be encoded.

The loop filter 111 supplies the result of filtering (the decoded image resulting from the filtering) to the frame memory 112.

The selector 113 selects the component to which a reference image supplied from the frame memory 112 is to be supplied. In intra prediction, for example, the selector 113 supplies the reference image supplied from the frame memory 112 to the intra predictor 114. Alternatively, in inter prediction, for example, the selector 113 supplies the reference image supplied from the frame memory 112 to the motion estimator/compensator 115.

The intra predictor 114 performs intra prediction (intra-frame prediction) by using the reference image supplied from the frame memory 112 via the selector 113. The intra predictor 114 supplies a predicted image generated in an optimum mode to the predicted image selector 116. The intra predictor 114 also supplies intra prediction mode information indicating the employed intra prediction mode and like information, where necessary, to the lossless encoder 106, so that the information will be encoded.

The motion estimator/compensator 115 performs motion estimation (inter prediction) by using an input image supplied from the frame reordering buffer 102 and the reference image supplied from the frame memory 112 via the selector 113 and generates a predicted image (inter-predicted image) by motion compensation. The motion estimator/compensator 115 supplies the predicted image generated in an optimum inter prediction mode to the predicted image selector 116. The motion estimator/compensator 115 also supplies information indicating the employed inter prediction mode, information necessary for processing in the inter prediction mode to decode encoded data, and like information to the lossless encoder 106, so that the information will be encoded.

The predicted image selector 116 selects the source of the predicted imaged to be supplied to the arithmetic operation unit 103 and the arithmetic operation unit 110. Specifically, the predicted image selector 116 selects either one of the predicted image supplied from the intra predictor 114 and the predicted image supplied from the motion estimator/compensator 115, and supplies the selected predicted image to the arithmetic operation unit 103 and the arithmetic operation unit 110.

The rate controller 117 determines the method for controlling the rate of quantization operation of the quantizer 105 and actually controls the rate by the control method on the basis of the data amount of binary data (also referred to as a generated Bin) generated by the lossless encoder 106, the code amount of encoded data (also referred to as a generated Bit) accumulated in the accumulation buffer 107, and the like so as to prevent overflow or underflow.

The quantizer 105 acquires target bits (Target Bit) that are control information (a target value of the bit rate) for controlling the rate supplied from the rate controller 117, controls the quantization parameter so that the target bits (target rate) are obtained, and performs quantization.

In performing arithmetic coding such as the CABAC, the lossless encoder 106 supplies the data amount of the binary data (generated Bin) to the rate controller 117.

When the lossless encoder 106 performs the variable-length coding such as the CAVLC, the accumulation buffer 107 supplies the data amount of the code stream (generated Bit) to the rate controller 117. The accumulation buffer 107 also acquires various parameters relating to the hypothetical decoder set by the rate controller 117, and transmits the parameters with the code stream.

[HRD Model]

Upon acquisition of a bit stream supplied from an encoder via a transmission path, a decoder holds the bit stream in a buffer. For decoding the bit stream, the decoder reads out necessary data from the buffer and performs decoding. In this case, if the buffer overflows (if the bit stream flows over the buffer) or if the buffer underflows (if the bit stream has not been entirely input when the decoder starts decoding), the decoder cannot successfully decode the bit stream.

Accordingly, the encoder has to generate a bit stream so as not to cause failure in the decoder that decodes the bit stream (so as not to cause overflow or underflow).

In order to realize the above, the concept of a hypothetical decoder has been introduced in coding techniques such as the AVC. A hypothetical decoder is a hypothetical model of behaviors of a decoder (states of the buffer). The encoder can generate a bit stream that does not cause failure in the decoder by performing encoding so as not to cause failure in the hypothetical decoder.

An HRD (hypothetical reference decoder) is a hypothetical decoder model defined by the H.264/AVC standard. The HRD includes a CPB (coded picture buffer) that is a buffer configured to save a bit stream before being input to the decoder, for example.

Figure 2:
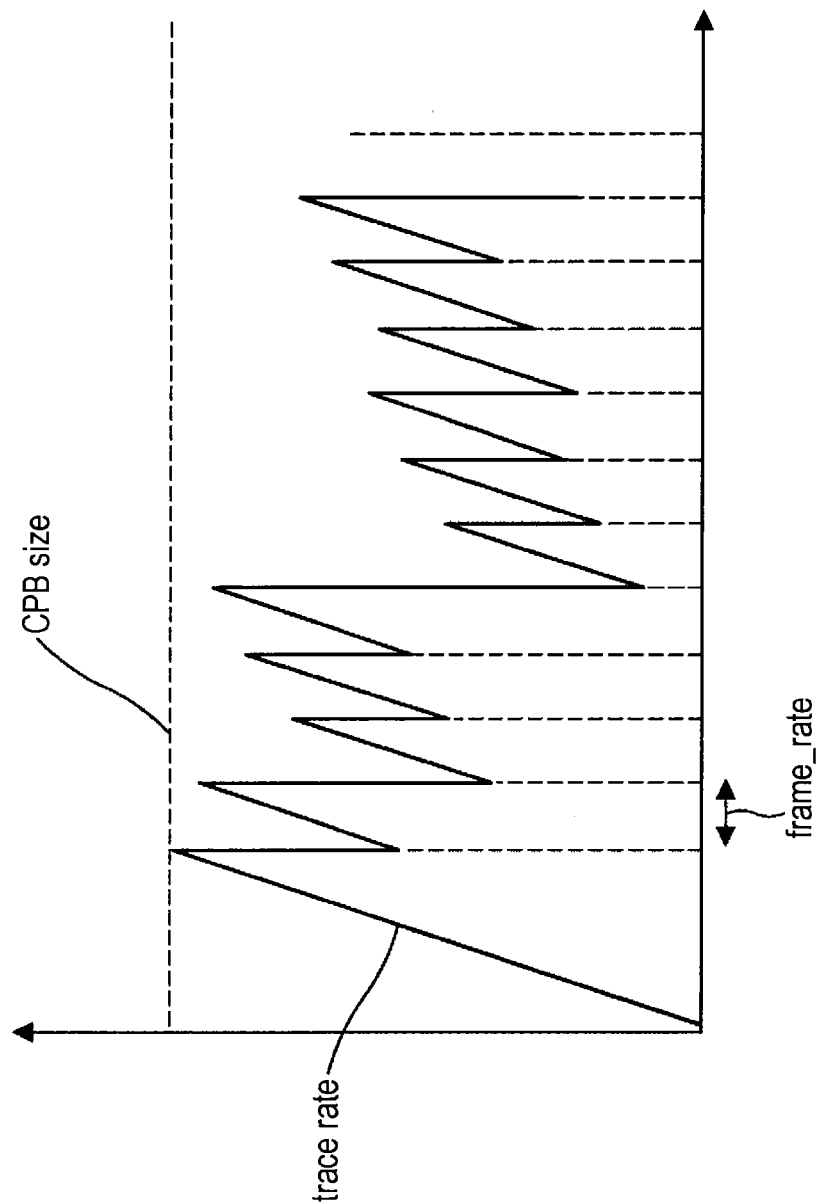
FIG. 2 is a graph showing an example of an HRD model.

FIG. 2 is a graph for explaining an example of the HRD model calculated by the rate controller 117. For the HRD, the rate (trace rate) of a bit stream flowing into the CPB and the size (CPB size) of the CPB are defined. The trace rate is defined by bit_rate_scale and bit_rate_value_minus1, and the CPB size is defined by cpb_size_scale and cpb_size_value_minus1.

These variables (bit_rate_scale, bit_rate_value_minus1, cpb_size_scale, and cpb_size_value_minus1) are written in syntax (HRD parameters syntax) as shown in FIG. 3.

In the graph of FIG. 2, the horizontal axis represents the direction of time and the vertical axis represents the code amount of the bit stream accumulated in the CPB. Vertical dotted lines represent timings at which data are read out from the CPB. In other words, the intervals of the dotted lines represent frame intervals (frame_rate). The curve in the graph of FIG. 2 represents the accumulated amount of the bit stream.

In the hypothetical decoder model, the bit stream supplied from the encoder is accumulated in the CPB until a next vertical dotted line (read-out timing). Thus, the slope of the curve in this case represents the trace rate of the bit stream.

At a read-out timing, a predetermined amount of bit stream accumulated in the CPB is instantly read out. Accordingly, the curve in the graph of FIG. 2 goes vertically downward. Then, the bit stream is accumulated until a next read-out timing (vertical dotted line).

In the CPB, such input and output of the bit stream is repeated. In FIG. 2, a horizontal dotted line represents the buffer size (CPB size) of the CPB (the maximum value of the code amount that can be accumulated). Thus, the curve in the graph of FIG. 2 going over the horizontal dotted line means that overflow of the buffer at a decoding timing has occurred.

In contrast, the curve in the graph of FIG. 2 going below the horizontal axis as a result of reading out of the bit stream from the CPB means that underflow where data has not reached at a decoding timing has occurred.

Thus, the encoder (image encoding device 100) needs to perform rate control so as not to cause underflow or overflow with the CPB size.

In related art, these parameters are all defined by a generated code amount. In the case of the CABAC, however, in the encoder, data is actually converted into binary data (also referred to as Bin) by a process called binarization so as to be input to an arithmetic coder and thereafter converted to a final bit stream (also referred to as Bit) by arithmetic coding. Typically, since a delay occurs in arithmetic coding, selection of conditions such as mode determination for macroblock is all completed at a timing when a final Bit for one frame is defined.

Figure 4:
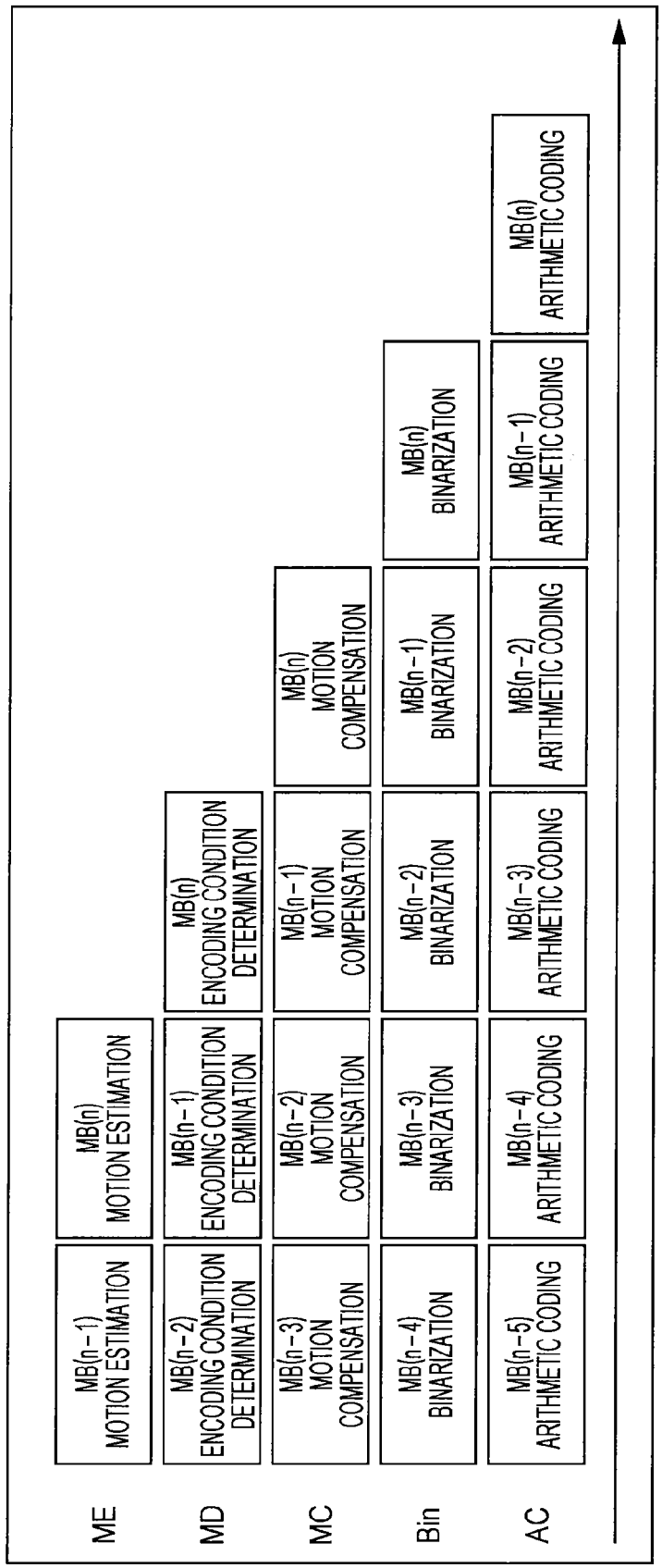
FIG. 4 is a diagram showing an example of a timing chart of an encoding process.

FIG. 4 shows an example of a timing chart of processes relating to encoding. Each box represents a process in each unit of processing. As shown in FIG. 3, encoding (other processes) is completed at a timing when the generated Bit amount after arithmetic coding is determined. Although it depends on the architecture, there is a delay of several frames until bit is determined from bin in some cases.

In rate control, an amount of Bit that can be used so as not to cause underflow in the HRD at a timing when encoding is started is obtained. When encoding is performed by the CABAC, a certain margin is required as shown in FIG. 5 even feedback control is performed on macroblocks because a delay occurs in determining the Bit.

Figure 5:
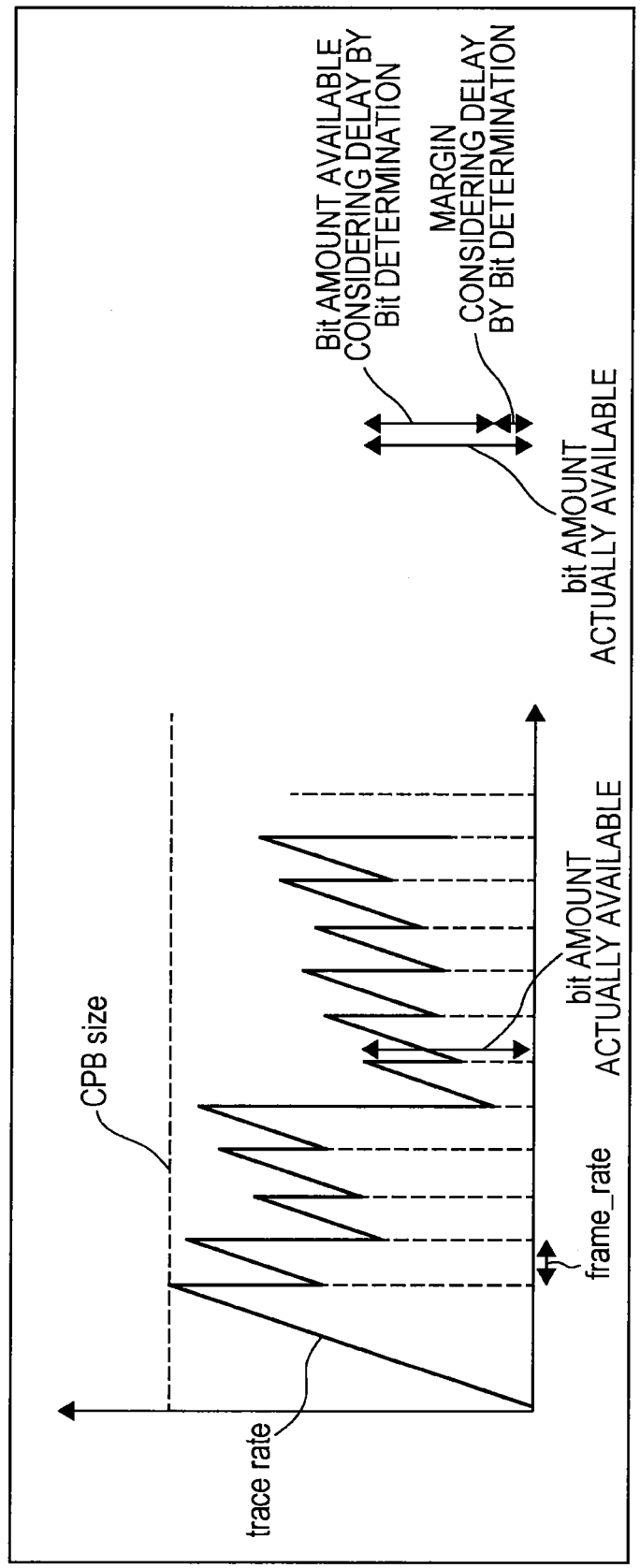
FIG. 5 is a graph for explaining an example of a state of HRD rate control defined by Bit.

In other words, since the margin considering a delay in Bit determination needs to be secured as shown in FIG. 5, there is a possibility that the encoder can only secure a Bit amount obtained by subtracting the margin from an actually available Bit amount.

When there is a delay of several frames until bit is determined from bin as described above, there is a possibility that the HRD trace in bit is not completed when initial_cpb_removal_delay or the like defined by the buffering period sei is to be determined, for example. In this case, a larger margin needs to be secured, which may further decrease the available Bit amount that can be secured.

This results not only in unnecessary reduction in the code amount but also in stricter conditions which makes encoding difficult.

[Definition by Bin]

Accordingly, the rate controller 117 of the image encoding device 100 in FIG. 1 defines HRD control by Bin. Specifically, the rate controller 117 defines the trace rate of the bit stream into the CPB and the CPB size by Bin (the trace rate bin and the CPB size bin).

Note that the generated Bin is always larger than the generated Bit. Furthermore, the transition of Bit is always smaller than the change in the HRD in Bin. Accordingly, conditions are always met also in the bit stream by defining the HRD by Bin and securing an amount corresponding to the size of Bin in the CPB. In other words, it is possible to generate a bit stream that does not cause failure in the decoder.

The definition of the HRD is easier by defining the HRD by Bin in this manner than by defining the HRD by Bit because it is not necessary to secure a margin for a delay. Thus, the image encoding device 100 can perform rate control more easily.

The HRD (CPB) is defined by defining the size and the position (accumulation amount) thereof, for example. For example, the rate controller 117 converts the HRD (CPB) defined by Bit into that defined by Bin by using a predetermined parameter. The parameter used for defining by the HRD (CPB), which is defined by Bit, by Bin will be referred to as a buffer model parameter (also referred to as a binary parameter).

Typically, Bin in the CABAC is about 1.2 times larger than Bit. The HRD in Bin may thus be 1.2 times that in Bit. FIG. 6 is a graph showing an example of comparison between an HRD model defined by Bin and an HRD model defined by Bit. The graph shown in FIG. 6 is obtained by super imposing an example of the HRD model defined by Bin on the graph of FIG. 2.

As shown in FIG. 6, the CPB size (CPB size bin) in the case of the HRD model defined by Bin is larger than that (CPB size) in the case of the HRD model defined by Bit. Furthermore, the CPB position (CPB pos bin) representing the data accumulation amount in the CPB at a point in the case of the HRD model defined by Bin is larger than that (CPB pos) in the case of the HRD model defined by Bit. Furthermore, the change in the CPB position is larger in the case of the HRD model defined by Bin.

The rate controller 117 can therefore perform rate control so that a bit stream that does not cause failure also in the HRD model defined by Bit is generated by controlling the bit rate so as not to cause failure by using the HRD model defined by Bin.

For such control, the rate controller 117 sets bit_to_bin representing a ratio of definition by Bin to definition by Bit as the buffer model parameter. In other words, bit_to_bin is a parameter for converting the code amount of the bit stream into the data amount of binary data. The rate controller 117 converts the HRD (CPB) defined by Bit into that defined by Bin by using the buffer model parameter bit_to_bin.

First, the trace rate (BitRate) of the bit stream into CPB and the CPB size (CpbSize) are defined as in the following equations (1) and (2) using the generated Bit amount.

$$BitRate[SchedSelIdx]=(bit\_rate\_value\_minus1[SchedSelIdx]+1)\times 2(6+bit\_rate\_scale) \quad (1)$$

$$CpbSize[SchedSelIdx]=(cpb\_size\_value\_minus1[SchedSelIdx]+1)\times 2(4+cpb\_size\_scale) \quad (2)$$

BitRate (the trace rate) and CpbSize obtained here are recalculated as expressed by the following equations (3) and (4) by using the bit_to_bin parameter to be converted into definition by Bin.

$$Bitrate=Bitrate\times(32+bit\_to\_bin)>>5 \quad (3)$$

$$CpbSize=CpbSize\times(32+bit\_to\_bin)>>5 \quad (4)$$

In the equations, ">>5" represents a shift of five bits to the right. The parameter bit_to_bin is a value within a range of "0" to "32". When bit_to_bin is "0", for example, BitRate and CpbSize defined by Bin are 1.0 times those defined by Bit. When bit_to_bin is "32", for example, BitRate and CpbSize defined by Bin are 2.0 times those defined by Bit. Thus, bit_to_bin can express 1.0 to 2.0 to an accuracy of 1/32.

Note that it is possible to switch between the CABAC and the CAVLC in the middle of a stream. When the coding technique is switched in this manner, the rate controller 117 further recalculates the CPB position (CPB pos) by using the bit_to_bin parameter as expressed by the following equation (5) or equation (6).

When the coding technique is switched from the CABAC to CAVLC:

$$CpbPos=CpbPos\times 32/(32+bit\_to\_bin) \quad (5)$$

When the coding technique is switched from the CAVLC to CABAC:

$$CpbPos=CpbPos\times(32+bit\_to\_bin)>>5 \quad (6)$$

FIG. 7 shows an example of the HRD model when the coding technique is switched. The graph shown in FIG. 7 is a graph similar to those shown in FIGS. 2 and 6. In the example of FIG. 7, however, the coding technique is switched from the CABAC to the CAVLC in the middle and then switched from the CAVLC to the CABAC.

The value of the bit_to_bin parameter is assumed to be "1.2" in the CABAC and "1.0" in the CAVLC. Thus, the HRD is defined by Bin in the CABAC while the HRD is defined by Bit in the CAVLC.

A straight line 131 represents the CPB buffer size (CPB size) during a first period of encoding in the CABAC. A straight line 132 represents the CPB buffer size (CPB size) during a period of encoding in the CAVLC. A straight line 133 represents the CPB buffer size (CPB size) during a second period of encoding in the CABAC. In other words, the straight line 131 and the straight line 133 represent the CPB buffer size (CPB size) defined by Bin, and the straight line 132 represents the CPB buffer size (CPB size) defined by Bit.

After encoding in the CABAC is started, the CPB position changes as expressed by a curve 134. Specifically, when the bit stream is accumulated in the CPB and a read-out timing is reached, the bit stream accumulated to a CPB position 134-1 is read out to a CPB position 134-2. Thereafter, accumulation is continued and the bit stream accumulated to a CPB position 134-3 is read out to a CPB position 134-4 at a next read-out timing. Similarly, at a next read-out timing, the bit stream accumulated to a CPB position 134-5 is read out to a CPB position 134-6, and at a further next read-out timing, the bit stream accumulated to a CPB position 134-7 is read out to a CPB position 134-8.

These are in Bin. These are converted into Bit (1/1.2), the bit stream will be accumulated to CPB positions P1 to P4 at the respective read-out timings. Thus, the CPB positions (P1 to P4) defined by Bit are always smaller than the CPB positions (CPB position 134-1, CPB position 134-3, CPB position 134-5, and CPB position 134-7) defined by Bin. Overflow will not, therefore, be caused in an HRD defined by Bit, either.

When the coding technique is switched from the CABAC to the CAVLC, the CPB position (CPB pos) is recalculated as in the aforementioned equation (5) using the bit_to_bin parameter. Specifically, the CPB position 134-8 is converted to the CPB position 135-1.

In this case, the CPB position 135-1 is smaller than the CPB position 134-8, but underflow will not be caused as a result of this conversion because the change in the CPB position in the HRD defined by Bin is smaller than that in the HRD defined by Bit.

As a result of encoding in the CAVLC, the CPB position changes as expressed by a curve 135. When the coding technique is switched from the CAVLC to the CABAC, the CPB position (CPB pos) is recalculated as in the aforementioned equation (6) using the bit_to_bin parameter. Specifically, the CPB position 135-2 is converted to the CPB position 136-1.

In this case, the CPB position 136-1 is larger than the CPB position 135-2, and underflow will not be caused by this conversion. Thereafter, as a result of encoding in the CABAC, the CPB position changes as expressed by a curve 136.

Since the rate controller 117 can easily switch between definition by Bin and definition by Bit without causing overflow or underflow as described above, the rate can be easily controlled even when the coding technique is switched.

[Syntax]

The rate controller 117 adds syntax as shown in FIG. 8 to the HRD parameters shown in FIG. 3 for rate control as described above. In the HRD parameters shown in FIG. 8, use_bin_hrd_flag, use_bit_to_bin_flag and bit_to_bin are added (lines 9 to 11 from the top) to the HRD parameters shown in FIG. 3.

The binary parameter use_bin_hrd_flag is a parameter (flag) indicating whether or not to provide an HRD by bin with an HRD parameter other than that for an HRD by bit. When this use_bin_hrd_flag is true, an HRD by bit and an HRD by bin are defined separately and traced separately.

The binary parameter use bit_to_bin is a parameter (flag) for determining whether or not to perform HRD trace conversion by bit_to_bin.

The binary parameter bit_to_bin is a conversion parameter for tracing the HRD with Bin. This bit_to_bin is defined only when use_bin_hrd_flag is true.

Such syntax is transmitted to the decoding side.

[Lossless Encoder]

Figure 9:
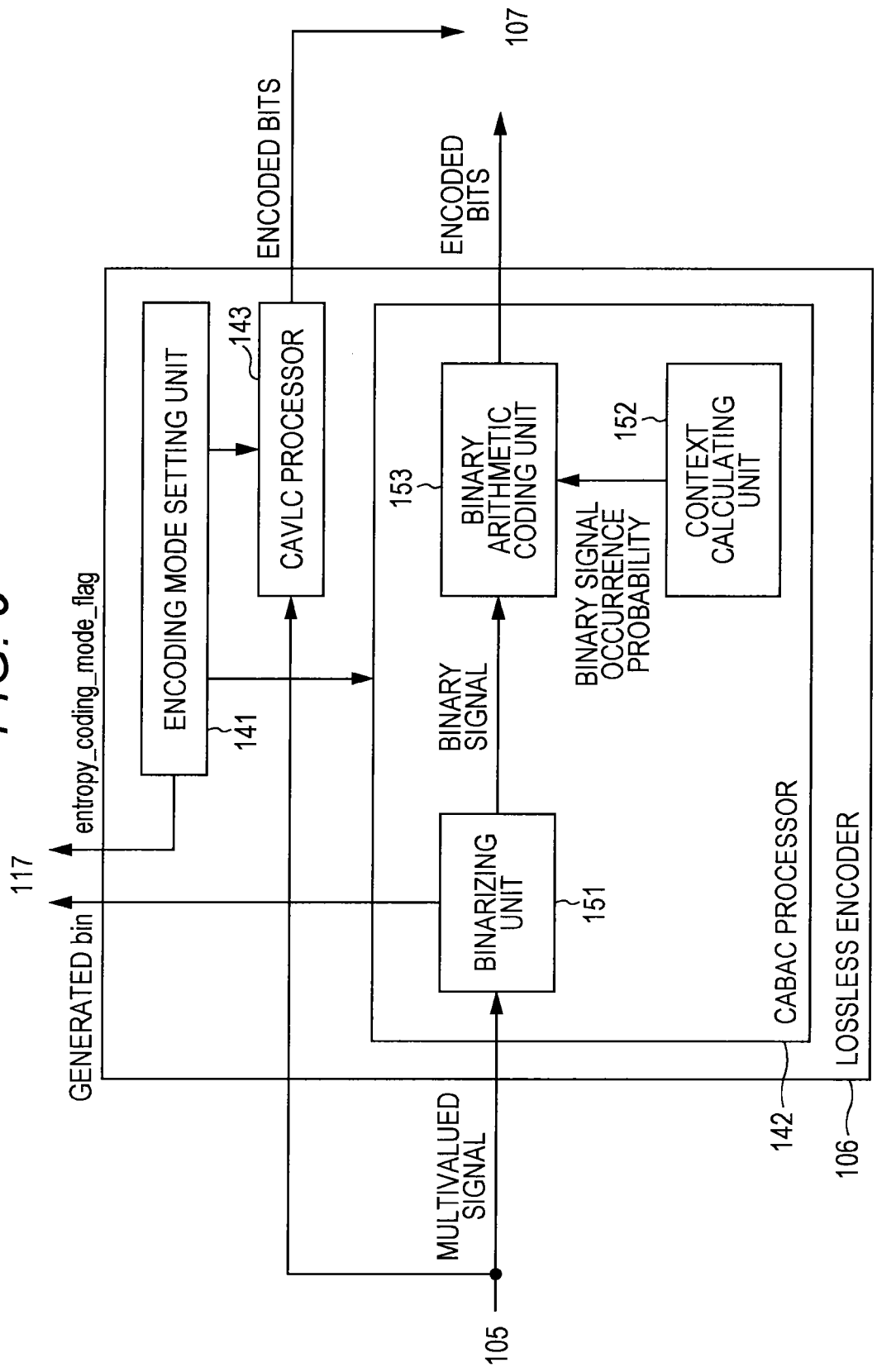
FIG. 9 is a block diagram showing a typical example structure of a lossless encoder.

Next, the respective components of the image encoding device 100 in FIG. 1 will be described more specifically. FIG. 9 is a block diagram showing a typical example structure of the lossless encoder 106.

As shown in FIG. 9, the image encoding device 100 includes an encoding mode setting unit 141, a CABAC processor 142, and a CAVLC processor 143.

The encoding mode setting unit 141 sets a mode of lossless coding. More specifically, the encoding mode setting unit 141 controls the CABAC processor 142 and the CAVLC processor 143, and sets whether to perform lossless coding in the CABAC or the CAVLC. The encoding mode setting unit 141 generates entropy_coding_mode_flag that is a parameter (flag) indicating the selected encoding mode, and supplies the parameter to the rate controller 117.

The CABAC processor 142 performs encoding in the CABAC according to the control of the encoding mode setting unit 141. Specifically, the CABAC processor 142 performs encoding if the CABAC is selected as the encoding mode by the encoding mode setting unit 141.

As shown in FIG. 9, the CABAC processor 142 includes a binarizing unit 151, a context calculating unit 152, and a binary arithmetic coding unit 153. The binarizing unit 151 binarizes a multivalued signal supplied from the quantizer 105, and supplies the resulting binary signal (binary data) to the binary arithmetic coding unit 153. The binary arithmetic coding unit 153 encodes the binary signal supplied from the binarizing unit 151 by using a binary signal occurrence probability supplied from the context calculating unit 152, and supplies the resulting encoded bits to the accumulation buffer 107.

The binarizing unit 151 also supplies the data amount (generated Bin) of the binary data generated as a result of binarization to the rate controller 117.

The CAVLC processor 143 performs encoding in the CAVLC according to the control of the encoding mode setting unit 141. Specifically, the CAVLC processor 143 performs encoding if the CAVLC is selected as the encoding mode by the encoding mode setting unit 141. The CAVLC processor 143 encodes a multivalued signal supplied from the quantizer 105, and supplies the resulting encoded bits to the accumulation buffer 107.

[Rate Controller]

Figure 10:
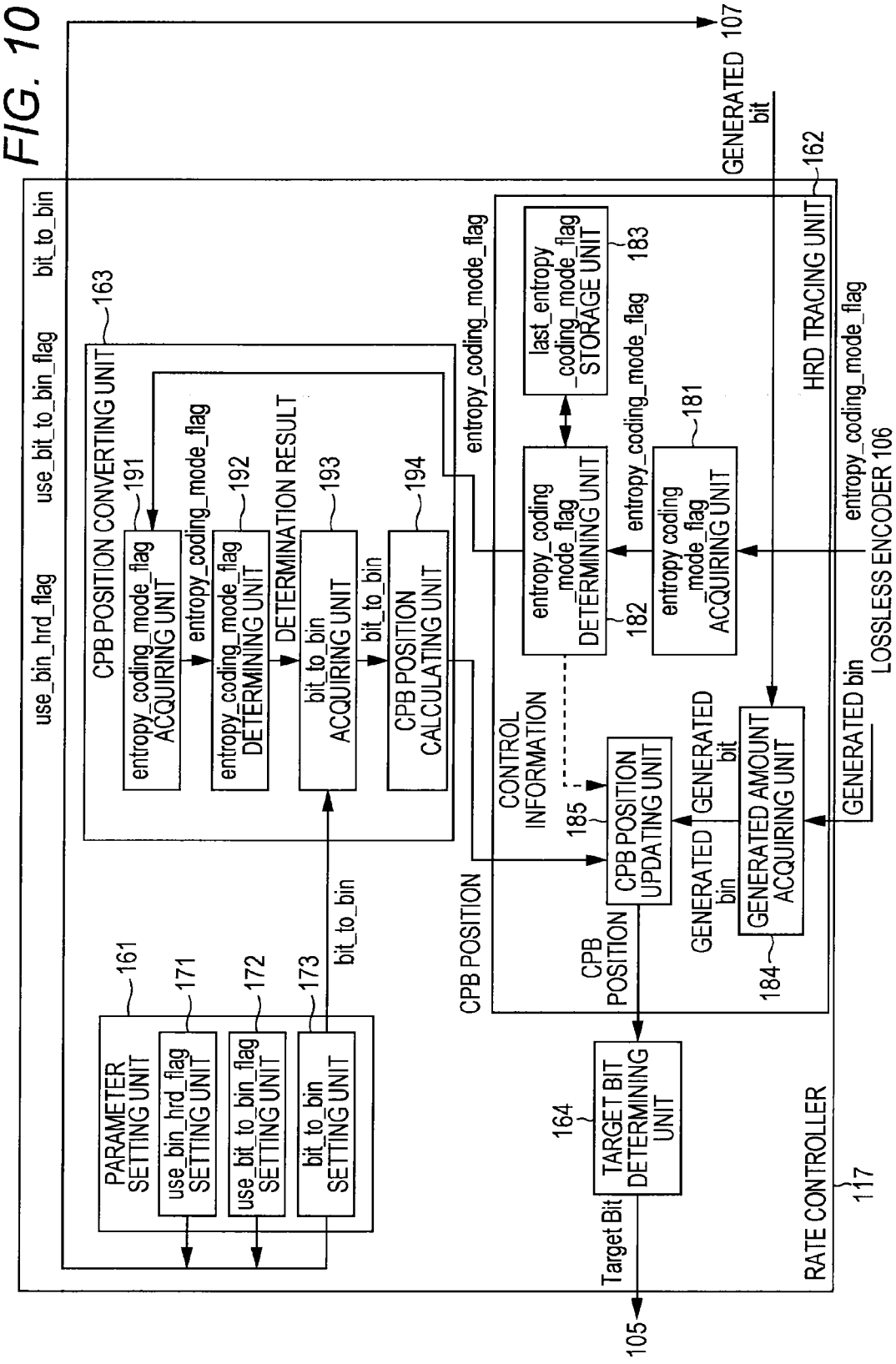
FIG. 10 is a block diagram showing a typical example structure of a rate controller.

FIG. 10 is a block diagram showing a typical example structure of the rate controller 117 in FIG. 1. As shown in FIG. 10, the rate controller 117 includes a parameter setting unit 161, an HRD tracing unit 162, a CPB position converting unit 163, and a target bit determining unit 164.

The parameter setting unit 161 sets syntax values such as parameters (including flags). The values may be set in any manner. For example, the parameter setting unit 161 may acquire a value from outside such as a developer or a user and set the value as a parameter. Alternatively, for example, the parameter setting unit 161 may set values on the basis of image data to be encoded or results of encoding. Still alternatively, for example, the parameter setting unit 161 may set a predetermined value as a parameter.

Note that the parameter setting unit 161 may set any parameter as long as the parameter is to be used for determined an HRD, which is defined by Bit, by Bin.

In the example of FIG. 10, the parameter setting unit 161 includes a use_bin_hrd_flag setting unit 171, a use_bit_to_bin_flag setting unit 172, and a bit_to_bin setting unit 173.

The use_bin_hrd_flag setting unit 171 sets use_bin_hrd_flag. The use bit_to_bin_flag setting unit 172 sets use_bit_to_bin_flag. The bit_to_bin setting unit 173 sets bit_to_bin. These values are supplied to the accumulation buffer 107 and transmitted as syntax to the decoding side.

The bit_to_bin setting unit 173 also supplies the generated bit_to_bin to the CPB position converting unit 163.

The HRD tracing unit 162 obtains the latest CPB position. For example, the HRD tracing unit 162 calculates the latest CPB position on the basis of generated Bin or generated Bit, and updates the CPB position by using the CPB position converting unit 163 along with switching between definition by Bin and definition by Bit when the coding technique is switched or in like cases.

As shown in FIG. 10, the HRD tracing unit 162 includes an entropy_coding_mode_flag acquiring unit 181, an entropy_coding_mode_flag determining unit 182, a last_entropy_coding_mode_flag storage unit 183, a generated amount acquiring unit 184, and a CPB position updating unit 185.

The entropy_coding_mode_flag acquiring unit 181 acquires entropy_coding_mode_flag from the lossless encoder 106, and supplies this entropy_coding_mode_flag to the entropy_coding_mode_flag determining unit 182. The entropy_coding_mode_flag determining unit 182 determines whether or not the value of entropy_coding_mode_flag supplied from the entropy_coding_mode_flag acquiring unit 181 and the value of last_entropy_coding_mode_flag that is previous entropy_coding_mode_flag stored in the last_entropy_coding_mode_flag storage unit 183 match each other.

If the values match each other, the entropy_coding_mode_flag determining unit 182 determines that the encoding mode is not to be switched, and supplies control information instructing to update the CPB position in the same mode as the previous mode to the CPB position updating unit 185. If the values do not match each other, the entropy_coding_mode_flag determining unit 182 supplies entropy_coding_mode_flag to the CPB position converting unit 163 to perform CPB position conversion with the switching of the encoding mode.

In the CABAC, the generated amount acquiring unit 184 acquires generated Bin (the data amount of generated binary data) from the lossless encoder 106, and supplies the generated Bin to the CPB position updating unit 185. In the CAVLC, the generated amount acquiring unit 184 acquires generated Bit (the code amount of a generated bit stream) from the accumulation buffer 107, and supplies the generated Bit to the CPB position updating unit 185.

The CPB position updating unit 185 updates the CPB position according to the control information supplied from the entropy_coding_mode_flag determining unit 182. For example, if the entropy_coding_mode_flag determining unit 182 instructs to update the CPB position on the basis of the generated Bin or the generated Bit, the CPB position updating unit 185 makes the generated amount acquiring unit 184 to acquire the generated Bin or the generated Bit and obtains the latest CPB position on the basis thereof. In the CABAC, for example, the CPB position updating unit 185 obtains the latest CPB position by using the generated Bin supplied from the generated amount acquiring unit 184. In the CAVLC, for example, the CPB position updating unit 185 obtains the latest CPB position by using the generated Bit supplied from the generated amount acquiring unit 184. The CPB position updating unit 185 supplies the obtained latest CPB position to the target bit determining unit 164.

When the CPB position updating unit 185 is informed by the entropy_coding_mode_flag determining unit 182 that the encoding mode is to be switched, the CPB position updating unit 185 supplies the CPB position supplied from the CPB position converting unit 163 as the latest CPB position to the target bit determining unit 164.

When entropy_coding_mode_flag is supplied from the entropy_coding_mode_flag determining unit 182 of the HRD tracing unit 162, the CPB position converting unit 163 determines that the encoding mode is switched and converts the CPB position. The CPB position converting unit 163 converts the CPB position from a position defined by Bit to a position defined by Bin or from a position defined by Bin to a position defined by Bit by using the parameter bit_to_bin set by the parameter setting unit 161.

As shown in FIG. 10, the CPB position converting unit 163 includes an entropy_coding_mode_flag acquiring unit 191, an entropy_coding_mode_flag determining unit 192, a bit_to_bin acquiring unit 193, and a CPB position calculating unit 194.

The entropy_coding_mode_flag acquiring unit 191 acquires entropy_coding_mode_flag supplied from the HRD tracing unit 162, and supplies the acquired entropy_coding_mode_flag to the entropy_coding_mode_flag determining unit 192. The entropy_coding_mode_flag determining unit 192 determines whether or not the value of this entropy_coding_mode_flag is true, and supplies the determination result to the bit_to_bin acquiring unit 193.

The bit_to_bin acquiring unit 193 acquires bit_to_bin from the parameter setting unit 161 (bit_to_bin setting unit 173), and supplies the acquired bit_to_bin together with the determination result to the CPB position calculating unit 194.

If the entropy_coding_mode_flag is true, the CPB position calculating unit 194 determines that the encoding mode has been switched from the CABAC to the CAVLC, and converts the CPB position by using the aforementioned equation (5). If the entropy_coding_mode_flag is false, the CPB position calculating unit 194 determines that the encoding mode has been switched from the CAVLC to the CABAC, and converts the CPB position by using the aforementioned equation (6).

The CPB position calculating unit 194 supplies the calculated CPB position to the HRD tracing unit 162 (CPB position updating unit 185).

The target bit setting unit 164 determines the value of a target bit (Target Bit) on the basis of the latest CPB position supplied from the HRD tracing unit 162 (CPB position updating unit 185).

The target bit determining unit 164 supplies the determined value to the quantizer 105.

Through the processes of the respective components as described above, the rate controller 117 can perform rate control more easily by using an HRD defined by Bin.

[Flow of Encoding Process]

Next, flows of processes performed by the image encoding device 100 as described above will be described. First, an example of a flow of an encoding process will be described with reference to the flowchart of FIG. 11.

In step S101, the A/D converter 101 performs A/D conversion on an input image. In step S102, the frame reordering buffer 102 stores the image obtained by the A/D conversion and reorders respective pictures in display order into encoding order.

In step S103, the intra predictor 114 performs an intra prediction process in the intra prediction mode. In step S104, the motion estimator/compensator 115 performs an inter motion estimation process in which motion estimation and motion compensation are performed in the inter prediction mode.

In step S105, the predicted image selector 116 determines an optimum mode on the basis of cost function values output from the intra predictor 114 and the motion estimator/compensator 115. Specifically, the predicted image selector 116 selects either one of a predicted image generated by the intra predictor 114 and a predicted image generated by the motion estimator/compensator 115.

In step S106, the arithmetic operation unit 103 computes a difference between the reordered image obtained by the processing in step S102 and the predicted image selected by the processing in step S105. The difference data is reduced in the data amount as compared to the original image data. Accordingly, the data amount can be made smaller as compared to a case in which images are directly encoded.

In step S107, the orthogonal transformer 104 performs orthogonal transform on the difference information generated by the processing in step S106. Specifically, orthogonal transform such as discrete cosine transform or Karhunen-Loeve transform is performed and a transform coefficient is output.

In step S108, the quantizer 105 quantizes the orthogonal transform coefficient obtained by the processing in step S107.

The difference information quantized by the processing in step S108 is locally decoded as follows. In step S109, the inverse quantizer 108 performs inverse quantization on the quantized orthogonal transform coefficient (also referred to as a quantized coefficient) generated by the processing in step S108 with characteristics corresponding to those of the quantizer 105. In step S110, the inverse orthogonal transformer 109 performs inverse orthogonal transform on the orthogonal transform coefficient obtained by the processing in step S107 with characteristics corresponding to those of the orthogonal transformer 104.

In step S111, the arithmetic operation unit 110 adds the predicted image to the locally decoded difference information to generate a locally decoded image (an image corresponding to that input to the arithmetic operation unit 103). In step S112, the loop filter 111 performs, as necessary, a loop filtering process including deblocking filtering, adaptive loop filtering, and the like on the locally decoded image obtained by the processing in step S111.

In step S113, the frame memory 112 stores the decoded image subjected to the loop filtering process by the processing in step S112. Note that images that are not subjected to the filtering by the loop filter 111 are also supplied from the arithmetic operation unit 110 and stored in the frame memory 112.

In step S114, the lossless encoder 106 encodes the transform coefficient quantized by the processing in step S108. Specifically, lossless coding such as variable-length coding or arithmetic coding is performed on the difference image.

The lossless encoder 106 also encodes the quantized parameter calculated in step S108 and adds the parameter to the encoded data. The lossless encoder 106 also encodes information on the prediction mode of the predicted image selected by the processing in step S105 and adds the encoded information to the encoded data obtained by encoding the difference image. Specifically, the lossless encoder 106 also encodes information such as the optimum intra prediction mode information supplied from the intra predictor 114 or the information according to the optimum inter prediction mode supplied from the motion estimator/compensator 115 and adds the encoded information to the encoded data.

In step S115, the accumulation buffer 107 accumulates encoded data obtained by the processing in step S114. The encoded data accumulated in the accumulation buffer 107 is read out as necessary and transmitted to the decoding side via a transmission path or a recording medium.

In step S116, the rate controller 117 uses the HRD to control the rate of quantization operation of the quantizer 105 so as not to cause overflow or underflow at the HRD on the basis of the code amount (generated code amount) of encoded data accumulated in the accumulation buffer 107 by the processing in step S115 or the data amount of the binary data generated by the processing in step S114.

When arithmetic coding such as the CABAC is performed in step S114, the rate controller 117 performs rate control by using the HRD defined by Bin. If variable-length coding such as the CAVLC is performed in step S114, the rate controller 117 performs rate control by using the HRD defined by Bit.

The encoded process is terminated when the processing in step S116 ends.

[Flow of Rate Control Process]

Next, an example of a flow of the rate control process performed in step S116 of FIG. 11 will be described with reference to the flowchart of FIG. 12.

When the rate control process is started, the parameter setting unit 161 sets buffer model parameters used for defining an HRD, which is defined by Bit, by Bin in step S121.

When various parameters are set, the parameter setting unit 161 proceeds with the process. In step S122, the entropy_coding_mode_flag acquiring unit 181 of the HRD tracing unit 162 acquires entropy_coding_mode_flag supplied from the lossless encoder 106.

In step S123, the entropy_coding_mode_flag determining unit 182 determines whether or not the entropy_coding_mode_flag acquired in step S122 matches last_entropy_coding_mode_flag stored in the last_entropy_coding_mode_flag storage unit 183.

If it is determined that the entropy_coding_mode_flag and the last_entropy_coding_mode_flag match each other, the entropy_coding_mode_flag determining unit 182 advances the process to step S124. In step S124, the generated amount acquiring unit 184 acquires the generated Bit supplied from the accumulation buffer 107 or the generated Bin supplied from the lossless encoder 106.

In contrast, if it is determined that the entropy_coding_mode_flag and the last_entropy_coding_mode_flag do not match each other, the entropy_coding_mode_flag determining unit 182 advances the process to step S125. In step S125, the CPB position converting unit 163 performs a CPB position conversion process to convert the CPB position in switching of the encoding mode.

After termination of the processing in step S124 or step S125, the CPB position updating unit 185 updates the CPB position in step S126.

In step S127, the last_entropy_coding_mode_flag storage unit 183 updates (replaces) the last_entropy_coding_mode_flag stored therein with the entropy_coding_mode_flag supplied from the entropy_coding_mode_flag determining unit 182.

In step S128, the target bit determining unit 164 determines a target bit (Target Bit) on the basis of the CPB position updated in step S126, and supplies the Target Bit to the quantizer 105.

After terminating the processing in step S128, the target bit determining unit 164 terminates the rate control process.

[Flow of Parameter Setting Process]

Next, an example of a flow of the parameter setting process performed in step S121 of FIG. 12 will be described with reference to the flowchart of FIG. 13.

When the parameter setting process is started, the use_hrd_flag setting unit 171 sets use_bin_hrd_flag in step S131. In step S132, the use_bit_to_bin_flag setting unit 172 sets use_bit_to_bin_flag. In step S133, the bit_to_bin setting unit 173 sets bit_to_bin.

In step S134, the parameter setting unit 161 supplies the parameters set in steps S131 to S133 to the accumulation buffer 107, stores the parameters as syntax in a parameter set such as SEI (supplemental enhancement information), and transmits the parameter set. For example, the rate controller 117 may define the syntax using SEI (buffering period sei) relating to buffer management and transmit the defined syntax. Furthermore, for example, the rate controller 117 may include the syntax in a bit stream (a header, for example) and transmit the bit stream to the decoding side.

Figure 12:
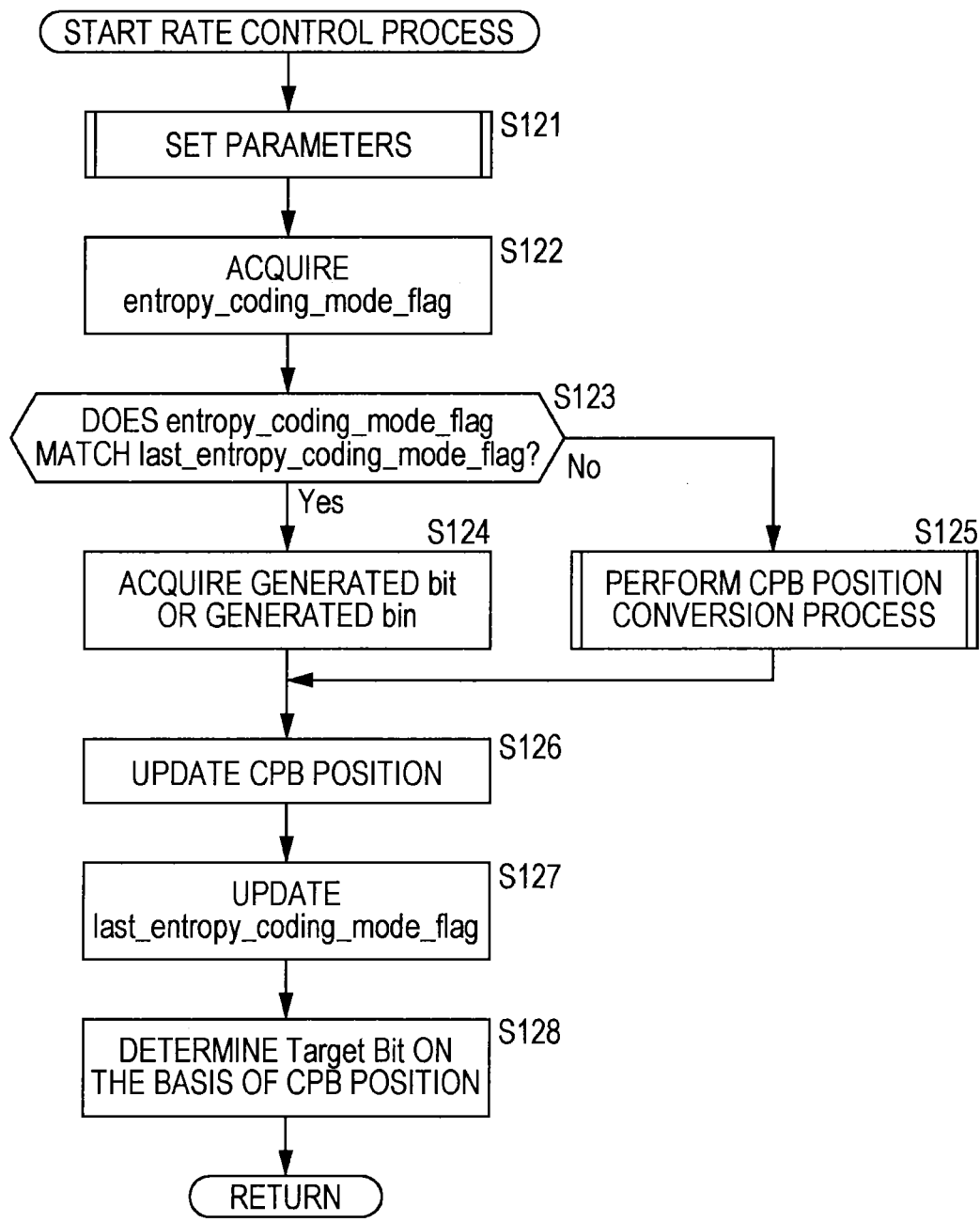
FIG. 12 is a flowchart for explaining an example of a flow of a rate control process.
Figure 13:
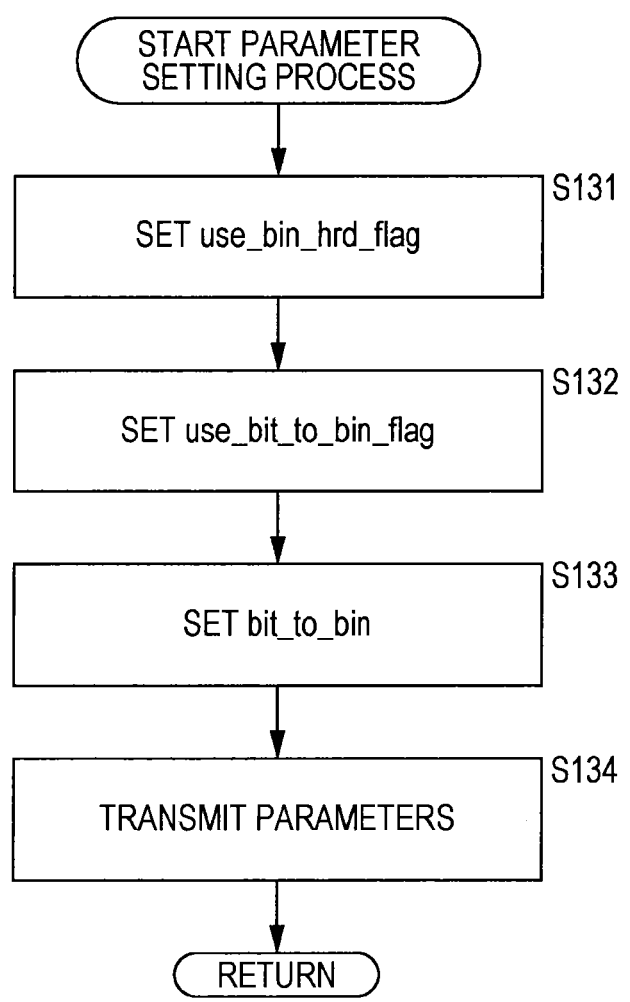
FIG. 13 is a flowchart for explaining an example of a flow of a parameter setting process.

After terminating the processing in step S134, the parameter setting unit 161 terminates the parameter setting process and returns the process to FIG. 12.

[Flow of CPB Position Conversion Process]

Figure 14:
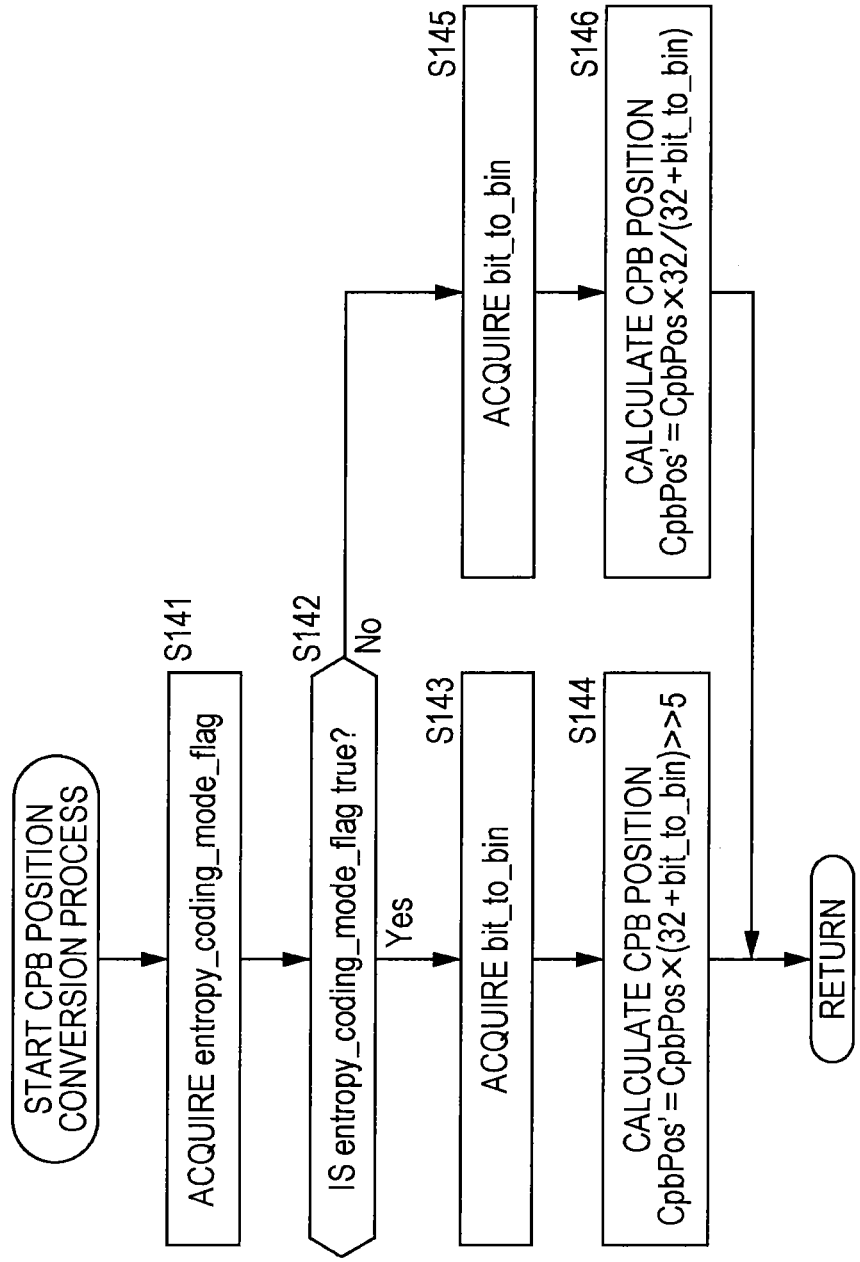
FIG. 14 is a flowchart for explaining an example of a flow of a CPB position conversion process.

Next, an example of a flow of the CPB conversion process performed in step S125 of FIG. 12 will be described with reference to the flowchart of FIG. 14.

When the CPB conversion process is started, the entropy_coding_mode_flag acquiring unit 191 acquires the entropy_coding_mode_flag supplied from the HRD tracing unit 162 in step S141. In step S142, the entropy_coding_mode_flag determining unit 192 determines whether or not the value of entropy_coding_mode_flag acquired in step S141 is true.

If the entropy_coding_mode_flag is determined to be true, the entropy_coding_mode_flag determining unit 192 determines that the encoding mode has been switched from the CABAC to the CAVLC and advances the process to step S143. In step S143, the bit_to_bin acquiring unit 193 acquires the bit_to_bin set by the parameter setting unit 161. In step S144, the CPB position calculating unit 194 calculates the CPB position by using the equation (5).

If the entropy_coding_mode_flag is determined to be false in step S142, the entropy_coding_mode_flag determining unit 192 determines that the encoding mode has been switched from the CAVLC to the CABAC and advances the process to step S145. In step S145, the bit_to_bin acquiring unit 193 acquires the bit_to_bin set by the parameter setting unit 161. In step S146, the CPB position calculating unit 194 calculates the CPB position by using the equation (6).

When the processing in step S144 or step S146 is terminated, the CPB position converting unit 163 terminates the CPB position conversion process and returns the process to FIG. 12.

As a result of performing the processes as described above, the rate controller 117 can define the HRD by Bin, and also set buffer model parameters used therefor and transmit the parameters to the decoding side. As a result, the rate controller 117 can perform rate control more easily.

While a case in which the rate controller 117 converts an HRD defined by Bit to an HRD defined by Bin by using bit_to_bin has been explained above, an HRD defined by Bit and an HRD defined by Bin may be set independently of each other.

2. Second Embodiment

[Image Decoding Device]

Figure 15:
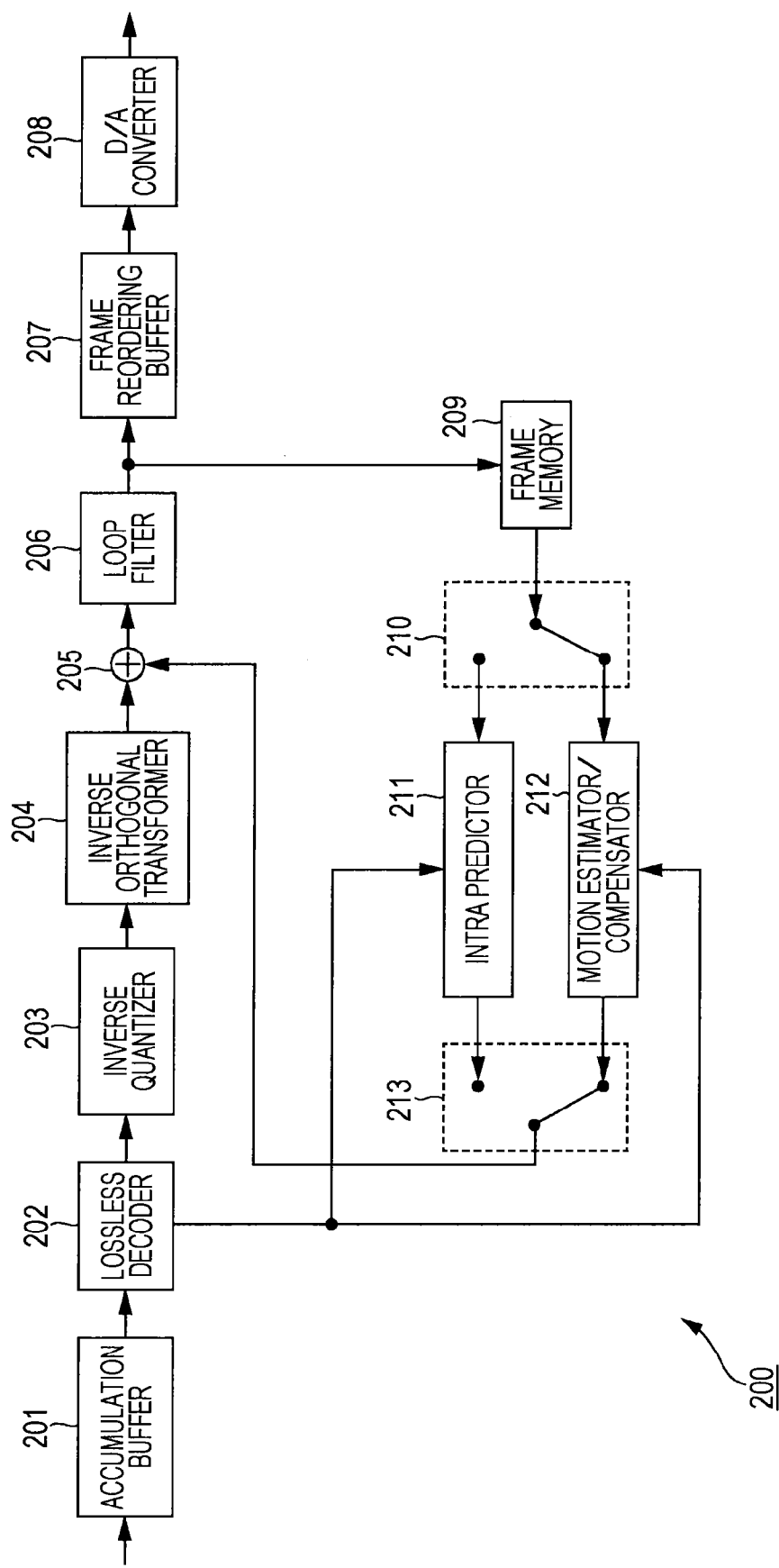
FIG. 15 is a block diagram showing a typical example structure of an image decoding device.

FIG. 15 is a block diagram showing a typical example structure of an image decoding device. The image decoding device 200 shown in FIG. 15 decodes the encoded data generated by the image encoding device 100 in a decoding method corresponding to the encoding method.

As shown in FIG. 15, the image decoding device 200 includes an accumulation buffer 201, a lossless decoder 202, an inverse quantizer 203, an inverse orthogonal transformer 204, an arithmetic operation unit 205, a loop filter 206, a frame reordering buffer 207, and a D/A converter 208. The image decoding device 200 also includes a frame memory 209, a selector 210, an intra predictor 211, a motion estimator/compensator 212, and a selector 213.

The accumulation buffer 201 accumulates transmitted encoded data, and supplies the encoded data to the lossless decoder 202. The lossless decoder 202 decodes information encoded by the lossless encoder 106 in FIG. 1 and supplied from the accumulation buffer 201 according to the syntax supplied from the image encoding device 100 by a technique corresponding to the coding technique of the lossless encoder 106. The lossless decoder 202 supplies quantized coefficient data of a difference image obtained by decoding to the inverse quantizer 203.

The lossless decoder 202 also determines whether the intra prediction mode is selected or the inter prediction mode is selected as the optimum prediction mode, and supplies information on the optimum prediction mode to either of the intra predictor 211 and the motion estimator/compensator 212 corresponding to the mode determined to be selected.

The inverse quantizer 203 performs inverse quantization on the quantized coefficient data obtained by decoding by the lossless decoder 202 according to a technique corresponding to the quantization technique of the quantizer 105 in FIG. 1, and supplies the resulting coefficient data to the inverse orthogonal transformer 204.

The inverse orthogonal transformer 204 performs inverse orthogonal transform on the coefficient data supplied from the inverse quantizer 203 according to a technique corresponding to the orthogonal transform technique of the orthogonal transformer 104 in FIG. 1. The inverse orthogonal transformer 204 obtains decoded residual data corresponding to residual data before being subjected to orthogonal transform in the image encoding device 100.

The decoded residual data obtained by the inverse orthogonal conversion is supplied to the arithmetic operation unit 205. In addition, a predicted image is supplied to the arithmetic operation unit 205 from the intra predictor 211 or the motion estimator/compensator 212 via the selector 213.

The arithmetic operation unit 205 adds the decoded residual data and the predicted image to obtain decoded image data corresponding to image data before the predicted image is subtracted by the arithmetic operation unit 103 in the image encoding device 100. The arithmetic operation unit 205 supplies the decoded image data to the loop filter 206.

The loop filter 206 performs loop filtering including deblocking filtering, adaptive loop filtering and the like on the supplied decoded image as necessary, and supplies the resulting image to the frame reordering buffer 207.

The loop filter 206 includes a deblocking filter, an adaptive loop filter or the like, and performs appropriate filtering on the decoded image supplied from the arithmetic operation unit 205. For example, the loop filter 206 performs deblocking filtering on the decoded image to remove block distortion from the decoded image. In addition, for example, the loop filter 206 performs loop filtering on the result of deblocking filtering (the decoded image from which block distortion is removed) by using a Wiener filter to improve the image quality.

Alternatively, the loop filter 206 may perform certain filtering on the decoded image. Furthermore, the loop filter 206 may perform filtering by using a filter coefficient supplied from the image encoding device 100 of FIG. 1.

The loop filter 206 supplies the result of filtering (the decoded image resulting from the filtering) to the frame reordering buffer 207 and the frame memory 209. Note that the decoded image output from the arithmetic operation unit 205 can be supplied to the frame reordering buffer 207 and the frame memory 209 without passing through the loop filter 206. Thus, filtering by the loop filter 206 may be omitted.

The frame reordering buffer 207 performs image reordering. Specifically, the frames reordered into the encoding order by the frame reordering buffer 102 in FIG. 1 are reordered into the original display order. The D/A converter 208 performs a D/A conversion on the image supplied from the frame reordering buffer 207, and outputs the converted image to a display (not shown) to display the image.

The frame memory 209 stores the supplied decoded image, and supplies the stored decoded image as a reference image to the selector 210 at predetermined timing or on the basis of an external request such as a request from the intra predictor 211 or the motion estimator/compensator 212.

The selector 210 selects the component to which the reference image supplied from the frame memory 209 is to be supplied. For decoding an intra-coded image, the selector 210 supplies the reference image supplied from the frame memory 209 to the intra predictor 211. For decoding an inter-coded image, the selector 210 supplies the reference image supplied from the frame memory 209 to the motion estimator/compensator 212.

The intra predictor 211 is supplied, as necessary, with information indication the intra prediction mode or the like obtained by decoding header information from the lossless decoder 202. The intra predictor 211 performs intra prediction by using the reference image acquired from the frame memory 209 in intra prediction mode used by the intra predictor 114 in FIG. 1 to generate a predicted image. The intra predictor 211 supplies the generated predicted image to the selector 213. The motion estimator/compensator 212 acquires the information obtained by decoding the header information from the lossless decoder 202.

The motion estimator/compensator 212 performs inter prediction by using the reference image acquired from the frame memory 209 in the inter prediction mode used by the motion estimator/compensator 115 in FIG. 1 to generate a predicted image.

In this manner, the lossless decoder 202 can decode a code stream supplied from the image encoding device 100. In other words, the image decoding device 200 can realize facilitation of rate control.

[Lossless Decoder]

Figure 16:
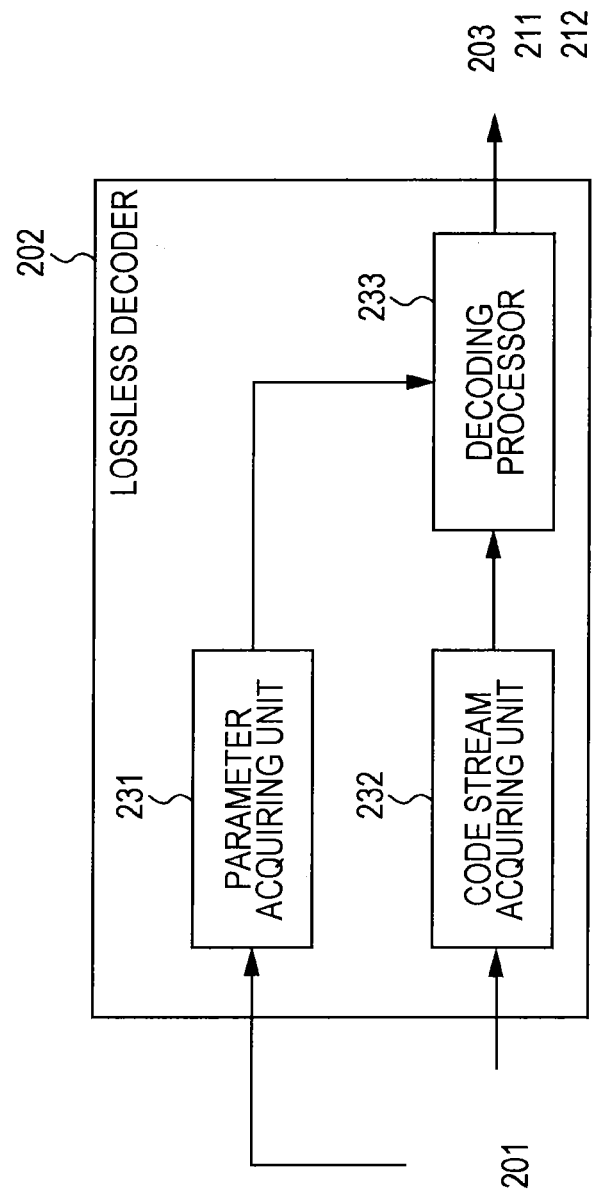
FIG. 16 is a block diagram showing a typical example structure of a lossless decoder.

FIG. 16 is a block diagram showing a typical example structure of the lossless decoder 202.

As shown in FIG. 16, the lossless decoder 202 includes a parameter acquiring unit 231, a code stream acquiring unit 232, and a decoding processor 233.

The parameter acquiring unit 231 receives the buffer model parameters supplied as syntax from the image encoding device 100 that are supplied from the accumulation buffer 201, and supplies the received parameters to the decoding processor 233.

The code stream acquiring unit 232 receives the code stream supplied from the image encoding device 100 that is supplied from the accumulation buffer 201, and supplied the received code stream to the decoding processor 233.

The decoding processor 233 behaves similarly to the HRD set by the image encoding device 100 toward the code stream supplied from the code stream acquiring unit 232 on the basis of binary parameters supplied from the parameter acquiring unit 231. Specifically, the decoding processor 233 decodes the code stream supplied from the code stream acquiring unit 232 similarly to the HRD set by the rate controller 117 of the image encoding device 100. The decoding processor 233 supplies the obtained decoded image data to the inverse quantizer 203. The decoding processor 233 also supplies, as necessary, the header information and the like to the intra predictor 211 or the motion estimator/compensator 212.

As a result of the operation of the lossless decoder 202 similar to that of the HRD set in the image encoding device 100, the image decoding device 200 can realize facilitation of rate control.

[Flow of Decoding Process]

Next, flows of processes performed by the image decoding device 200 as described above will be described. First, an example of a flow of a decoding process will be described with reference to the flowchart of FIG. 17.

When the decoding process is started, the accumulation buffer 201 accumulates a transmitted code stream in step S201. In step S202, the lossless decoder 202 decodes the code stream supplied from the accumulation buffer 201. Specifically, I-pictures, P-pictures, and B-pictures encoded by the lossless encoder 106 in FIG. 1 are decoded. In addition, various information pieces such as difference motion information and difference quantized parameters other than the difference image information contained in the code stream are also decoded.

In step S203, the inverse quantizer 203 performs inverse quantization on the quantized orthogonal transform coefficient obtained by the processing in step S202.

In step S204, the inverse orthogonal transformer 204 performs inverse orthogonal transform on the orthogonal transform coefficient obtained by the inverse quantization in step S203.

In step S205, the intra predictor 211 or the motion estimator/compensator 212 performs a prediction process using the supplied information.

In step S206, the selector 213 selects a predicted image generated in step S205.

In step S207, the arithmetic operation unit 205 adds the predicted image selected in step S206 to the difference image information obtained by the inverse orthogonal transform in step S204. As a result, a decoded image can be obtained.

In step S208, the loop filter 206 performs, as necessary, a loop filtering process including deblocking filtering, adaptive loop filtering, and the like on the decoded image obtained in step S207.

In step S209, the frame reordering buffer 207 reorders the image subjected to the filtering in step S208. Specifically, the frames reordered into the encoding order by the frame reordering buffer 102 of the image encoding device 100 are reordered into the original display order.

In step S210, the D/A converter 208 performs D/A conversion on the image subjected to the frame reordering in step S209. This image is output to the display (not shown) and displayed thereon.

In step S211, the frame memory 209 stores the image subjected to the filtering in step S208. This image is used as a reference image for generation of a predicted image in step S205.

The decoding process is terminated when the processing in step S211 is terminated.

[Flow of Lossless Decoding Process]

Next, an example of a flow of the lossless decoding process performed in step S202 of FIG. 17 will be described with reference to the flowchart of FIG. 18.

When the lossless decoding process is started, the parameter acquiring unit 231 receives buffer model parameters generated in the image encoding device 100 and supplied as syntax in step S231.

In step S232, the decoding processor 233 determines the decoding method according to the values of binary parameters received in step S231.

In step S233, the code stream acquiring unit 232 receives a code stream generated in the image encoding device 100 and supplied thereto.

In step S234, the decoding processor 233 decodes the code stream received in step S233 by the decoding method determined in step S232.

Figure 17:
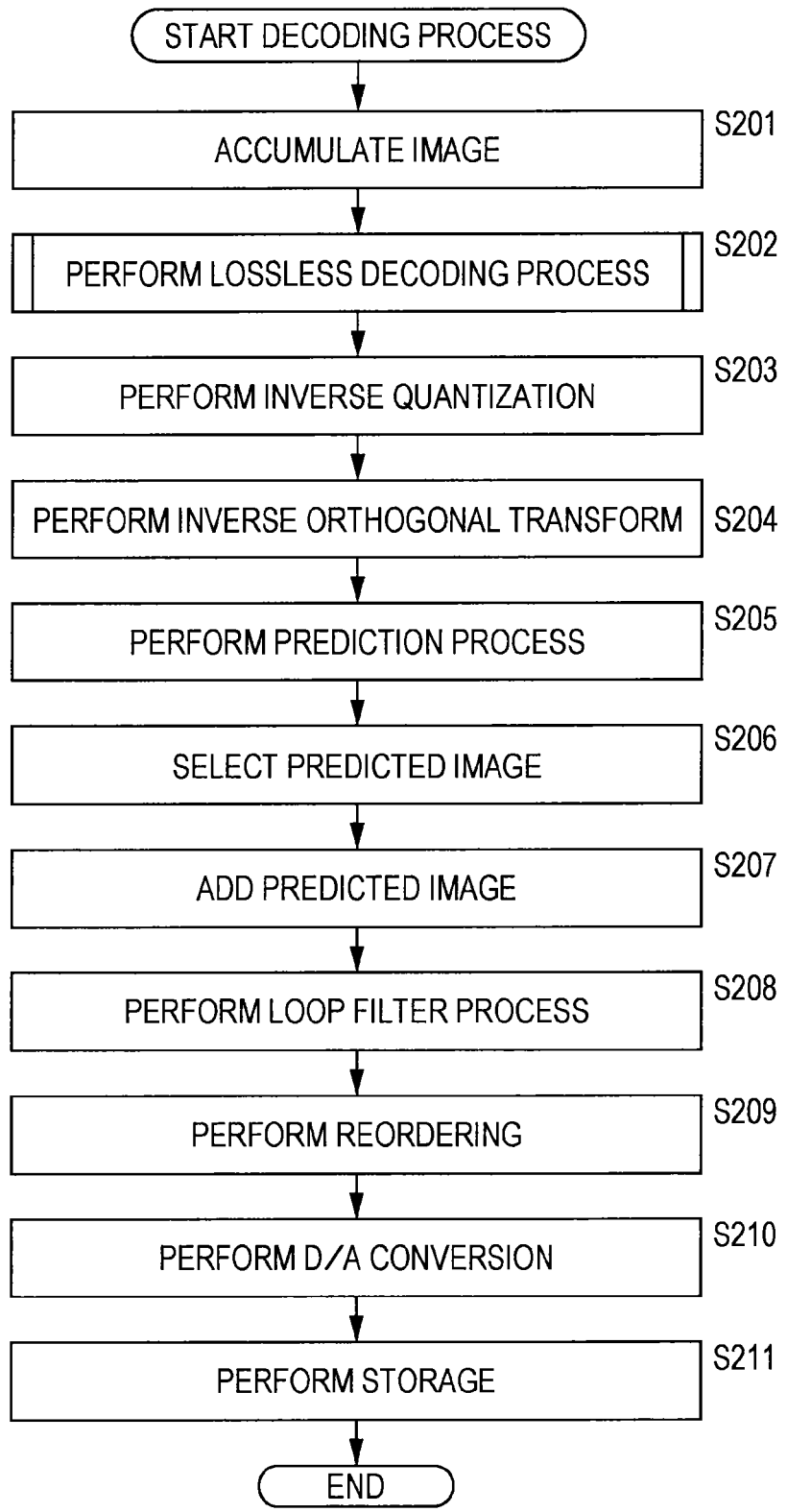
FIG. 17 is a flowchart for explaining an example of a flow of a decoding process.
Figure 18:
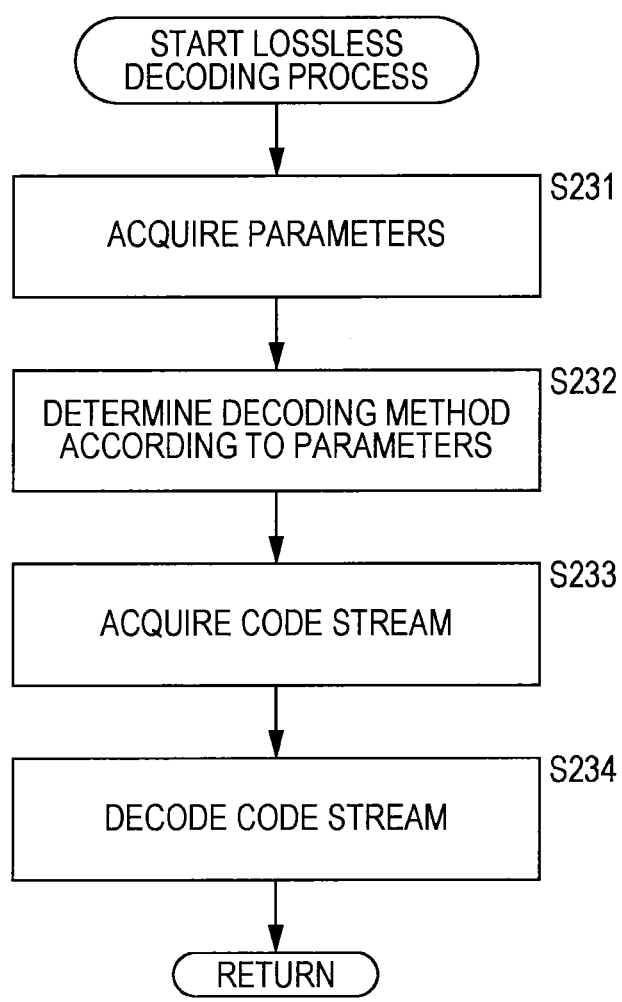
FIG. 18 is a flowchart for explaining an example of a flow of a lossless decoding process.

After decoding the code stream, the lossless decoder 202 terminates the lossless decoding process and returns the process to FIG. 17.

As a result of performing the processes as described above, the image decoding device 200 can realize facilitation of rate control.

3. Third Embodiment

[Design of Decoder]

In existing standards such as the AVC, it is considered that conversion from a bit stream to binary data must be performed instantly in the design of a decoder in the CABAC. Thus, in designing a decoder, the decoder must be able to perform conversion to binary data at a maximum frame rate of a maximum Bit length of one access unit (AU).

In an actual bit stream, however, the maximum Bit length rarely continues for a long time but the bit length actually has a large value for an I-picture and a sufficiently small value for a P-picture or a B-picture. Accordingly, in general, it is often not necessary to instantly perform conversion to binary data at the maximum frame rate when time averaging is applied. Thus, since design of decoders under present circumstances is so-called worst case design, the decoders may be designed to have excessive performance as compared to performance that is actually required. In other words, it may be difficult to design a decoder in the CABAC owing to the constraints.

A hypothetical decoder defining the processing rate of binary data is therefore defined. In this manner, the design of decoders can be more flexible. Furthermore, it is possible to check whether or not decoding can be performed successfully from syntax, which can widen the range of applications. For example, in a case of a decoder to be mounted on a mobile device or the like, it is possible to make such design that the power consumption is lowered by lowering the processing rate of binary data a little As described above, the encoder generates a stream compatible with the hypothetical decoder. In other words, the encoder is configured to define the hypothetical decoder defining the processing rate of binary data and perform rate control by using the hypothetical decoder. In this manner, it is possible to generate a code stream that does not cause failure even in a decoder with relatively lower performance. In other words, as a result of defining the hypothetical decoder defining the processing rate of binary data at the encoder, it is possible to make design of decoders more flexible and prevent the decoders from having excessive performance (control the performance of decoders at a suitable level).

[BinHRD]

Figure 19:
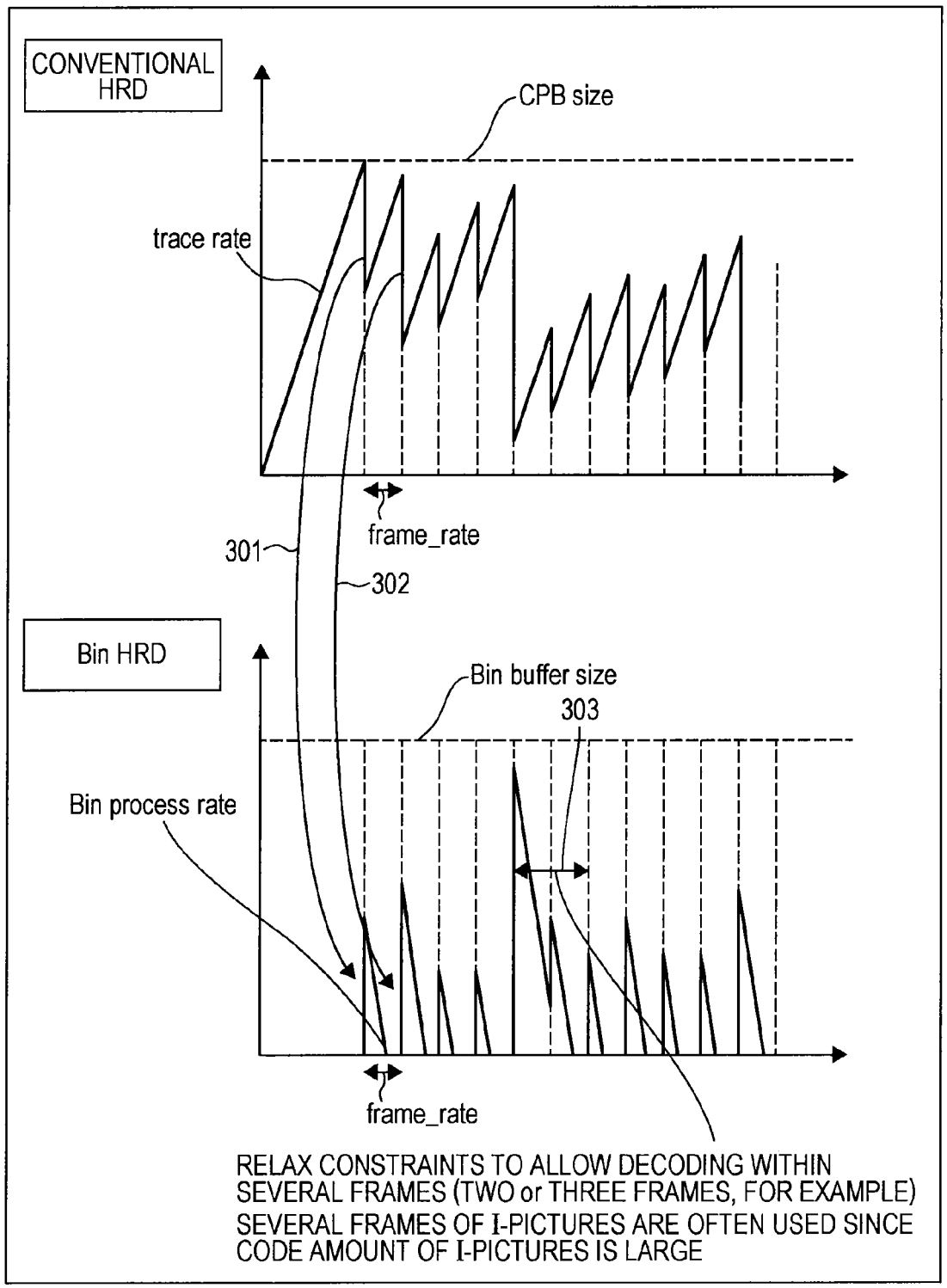
FIG. 19 shows graphs for explaining a BinHRD.

FIG. 19 shows an example of a hypothetical decoder defining the processing rate of binary data. In FIG. 19, the upper part represents a conventional hypothetical decoder (conventional HRD) and the lower part represents a hypothetical decoder (BinHRD) defining the processing rate of binary data.

A bit stream accumulated in the conventional HRD is converted to binary data as shown by arrows 301 and 302, made to flow into the BinHRD as binary data and accumulated therein. Note that the conversion from the bit stream to the binary data is assumed to be performed instantly.

The graph of the BinHRD shown in the lower part of FIG. 19 is basically similar to that of the conventional HRD shown in the upper part of FIG. 19. The Bin buffer size represents the size of the BinHRD. The Bin process rate represents the rate at which binary data accumulated in the BinHRD is read out. If the processing is completed during one frame, the BinHRD becomes empty. The consistency between encoding and decoding is guaranteed by controlling the size of the BinHRD not to exceed the Bin buffer size.

While binary data accumulated in the BinHRD is read out at the Bin process rate, conventional decoders need to be designed so that the whole binary data is read out during one frame (at the frame_rate). In this case, however, the design is made according to I-pictures with a large code amount as described above, which results in excessive performance for P-pictures and B-pictures with small code amounts. Therefore, as shown by a double-headed arrow 303, processing within several frames (about two or three frames, for example) is allowed.

Specifically, the rate (Bin process rate) at which binary data is read out may be lowered and it may take an amount of time corresponding to a plurality of frames to read out the whole binary data in the BinHRD. In this manner, it will particularly take an amount of time corresponding to a plurality of frames to read out binary data of I-pictures with a large code amount, but the possibility that the BinHRD overflows is very low because the code amounts of P-pictures and B-pictures are small and because the possibility that I-pictures continue for a long time is very low as described above.

A described above, decoders can be designed to have a lower binary data processing rate by defining hypothetical decoders defining the processing rate of binary data.

[Syntax]

In this case, syntax is added as shown in FIG. 20. As shown in FIG. 20, binary parameters bin_rate and bin_buffer_size are added in this case. The binary parameter bin_rate represents the binary data processing rate (the rate at which binary data is read out from the BinHRD), and the binary parameter bin_buffer_size represents the size of the BinHRD.

If these values are not set, maximum values according to the levels and the image size may be used.

[Image Encoding Device]

The structure of the image encoding device in this case is the same as the example shown in FIG. 1.

[Rate Controller]

Figure 21:
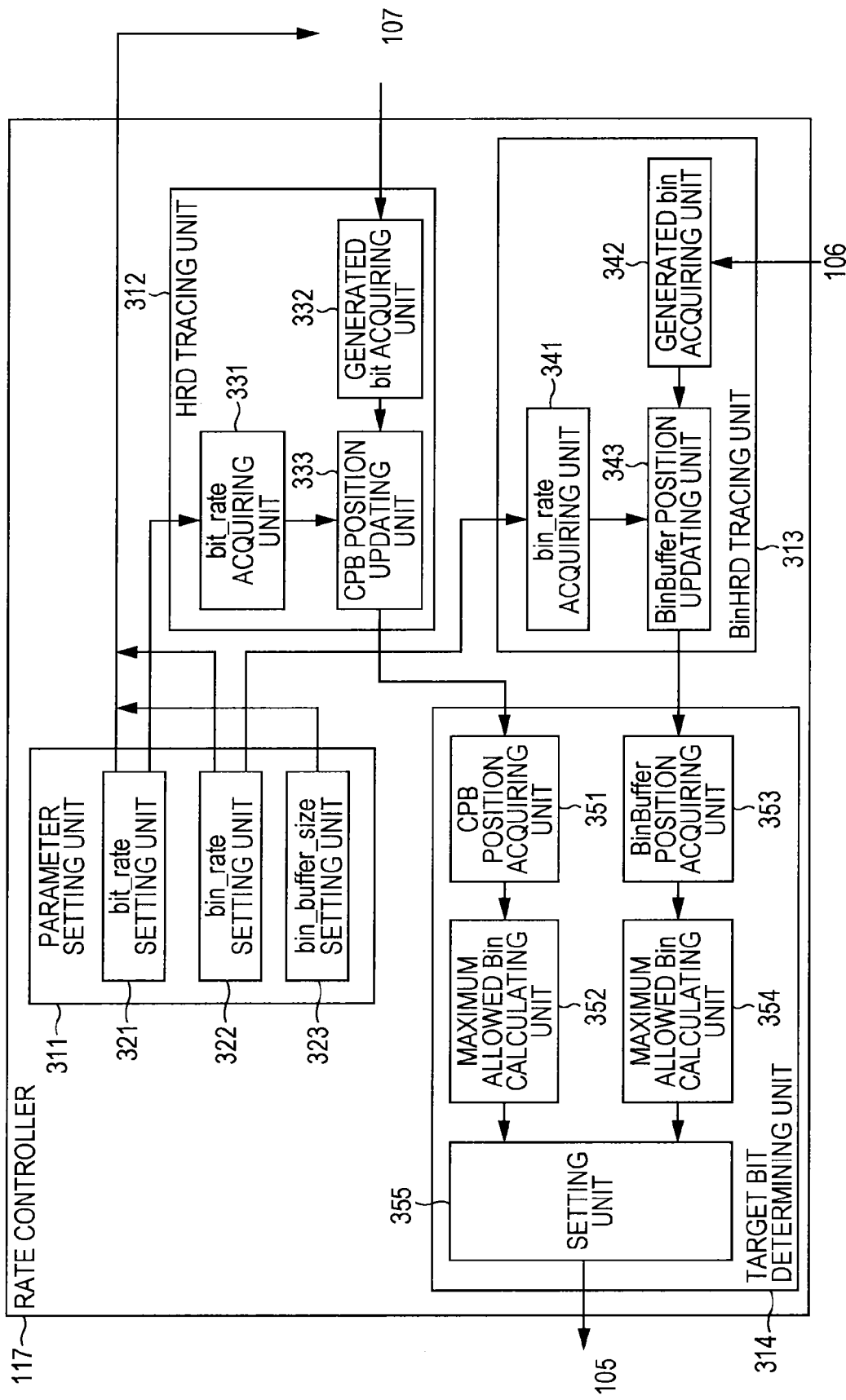
FIG. 21 is a block diagram showing another example structure of the rate controller.

FIG. 21 is a block diagram showing a typical example structure of a rate controller 117 in this case.

As shown in FIG. 21, the rate controller 117 includes a parameter setting unit 311, an HRD tracing unit 312, a BinHRD tracing unit 313, and a target bit determining unit 314.

The parameter setting unit 311 sets syntax values such as parameters (including flags). The values may be set in any manner. For example, the parameter setting unit 311 may acquire a value from outside such as a developer or a user and set the value as a parameter. Alternatively, for example, the parameter setting unit 311 may set values on the basis of image data to be encoded or results of encoding. Still alternatively, for example, the parameter setting unit 311 may set a predetermined value as a parameter.

The parameter setting unit 311 may set any parameters relating to the hypothetical decoder.

In the example shown in FIG. 21, the parameter setting unit 311 includes a bit_rate setting unit 321, a bin_rate setting unit 322, and a bin_buffer_size setting unit 323.

The bit_rate setting unit 321 sets bit_rate that is the rate at which a bit stream is processed. The bin_rate setting unit 322 sets bin_rate that is the rate at which binary data is processed. The bin_buffer_size setting unit 323 sets bin_buffer_size representing the size of the BinHRD. These values are supplied to the accumulation buffer 107 and transmitted as syntax to the decoding side.

The bit_rate setting unit 321 also supplies the generated bit_rate to the HRD tracing unit 312. The bin_rate setting unit 322 also supplies the generated bin_rate to the BInHRD tracing unit 313.

The HRD tracing unit 312 simulates the behavior of the hypothetical decoder (HRD) that processes a bit stream. Specifically, the HRD tracing unit 312 obtains the latest CPB position of the HRD. As shown in FIG. 21, the HRD tracing unit 312 includes a bit_rate acquiring unit 331, a generated Bit acquiring unit 332, and a CPB position updating unit 333.

The bit_rate acquiring unit 331 acquires the bit_rate supplied from the parameter setting unit 311 (bit_rate setting unit 321), and supplies the bit_rate to the CPB position updating unit 333. The generated Bit acquiring unit 332 acquires generated Bit that is a read-out amount (code amount) of a code stream (bit stream) from the accumulation buffer 107, and supplies the generated Bit to the CPB position updating unit 333.

The CPB position updating unit 333 updates the CPB position of the HRD on the basis of the bit_rate supplied from the bit_rate acquiring unit 331 and the generated Bit supplied from the generated Bit acquiring unit 332. Specifically, the bit stream in the amount of the generated Bit is accumulated in the CPB, and the bit stream corresponding to the bit_rate is read out from the CPB at predetermined read-out timing. The CPB position updating unit 333 reflects such input/output of the bit stream in the CPB position. The CPB position updating unit 333 supplies the latest CPB position to the target bit determining unit 314.

The BinHRD tracing unit 313 simulates the behavior of the hypothetical decoder (BinHRD) defining the binary data processing rate. Specifically, the BinHRD tracing unit 313 obtains the latest binary data accumulation amount (BinBuffer position) of the BinHRD. As shown in FIG. 21, the BinHRD tracing unit 313 includes a bin_rate acquiring unit 341, a generated Bin acquiring unit 342, and a BinBuffer position updating unit 343.

The bin_rate acquiring unit 341 acquires the bin_rate supplied from the parameter setting unit 311 (bin_rate setting unit 322), and supplies the bin_rate to the BinBuffer position updating unit 343. The generated Bin acquiring unit 342 acquires the generated Bin that is the data amount of binary data supplied from the lossless encoder 106, and supplies the generated Bin to the BinBuffer position updating unit 343.

The BinBuffer position updating unit 343 updates the BinBuffer position of the BinHRD on the basis of the bin_rate supplied from the bin_rate acquiring unit 341 and the generated Bin supplied from the generated Bin acquiring unit 342. Specifically, the binary data in the amount of generated Bin is accumulated in the BinHRD, and the binary data is read out at the rate represented by the bin_rate. The BinBuffer position updating unit 343 reflects such input/output of the binary data in the BinBuffer position. The BinBuffer position updating unit 343 supplies the latest BinBuffer position to the target bit determining unit 314.

The target bit determining unit 314 determines a target bit (Target Bit) on the basis of the CPB position and the BinBuffer position.

As shown in FIG. 21, the target bit determining unit 314 includes a CPB position acquiring unit 351, a maximum allowed Bit calculating unit 352, a BinBuffer position acquiring unit 353, a maximum allowed Bin calculating unit 354, and a setting unit 355.

The CPB position acquiring unit 351 acquires the latest CPB position supplied from the HRD tracing unit 312 (CPB position updating unit 333), and supplies the latest CPB position to the maximum allowed Bit calculating unit 352. The maximum allowed Bit calculating unit 352 calculates maximum allowed Bit representing the maximum amount of the bit stream that can be read from the HRD on the basis of the latest CPB position supplied from the CPB position acquiring unit 351. The maximum allowed Bit calculating unit 352 supplies the calculated maximum allowed Bit to the setting unit 355.

The BinBuffer position acquiring unit 353 acquires the latest BinBuffer position supplied from the BinHRD tracing unit 313 (BinBuffer position updating unit 343), and supplies the latest BinBuffer position to the maximum allowed Bin calculating unit 354. The maximum allowed Bin calculating unit 354 calculates maximum allowed Bin representing the maximum amount of the bit stream that can be read from the BinHRD on the basis of the latest BinBuffer position supplied from the BinBuffer position acquiring unit 353. The maximum allowed Bin calculating unit 354 supplies the calculated maximum allowed Bin to the setting unit 355.

The setting unit 355 obtains the target bit on the basis of the maximum allowed Bit supplied from the maximum allowed Bit calculating unit 352 and the maximum allowed Bin supplied from the maximum allowed Bin calculating unit 354. More specifically, the BinHRD and the HRD need to satisfy both. The setting unit 355 thus obtains the target bit on the basis of the smaller of the maximum allowed Bit and the maximum allowed Bin. The setting unit 355 supplies the obtained target bit to the quantizer 105.

Through the processes of the respective components as described above, the rate controller 117 can facilitate design of decoders by defining a hypothetical decoder defining the Bin processing rate. Furthermore, it is possible to check whether or not decoding can be performed successfully from syntax, which can widen the range of applications. As a result, it is easier to prevent failure in the hypothetical decoder and rate control can be performed more easily.

[Flow of Rate Control Process]

Figure 22:
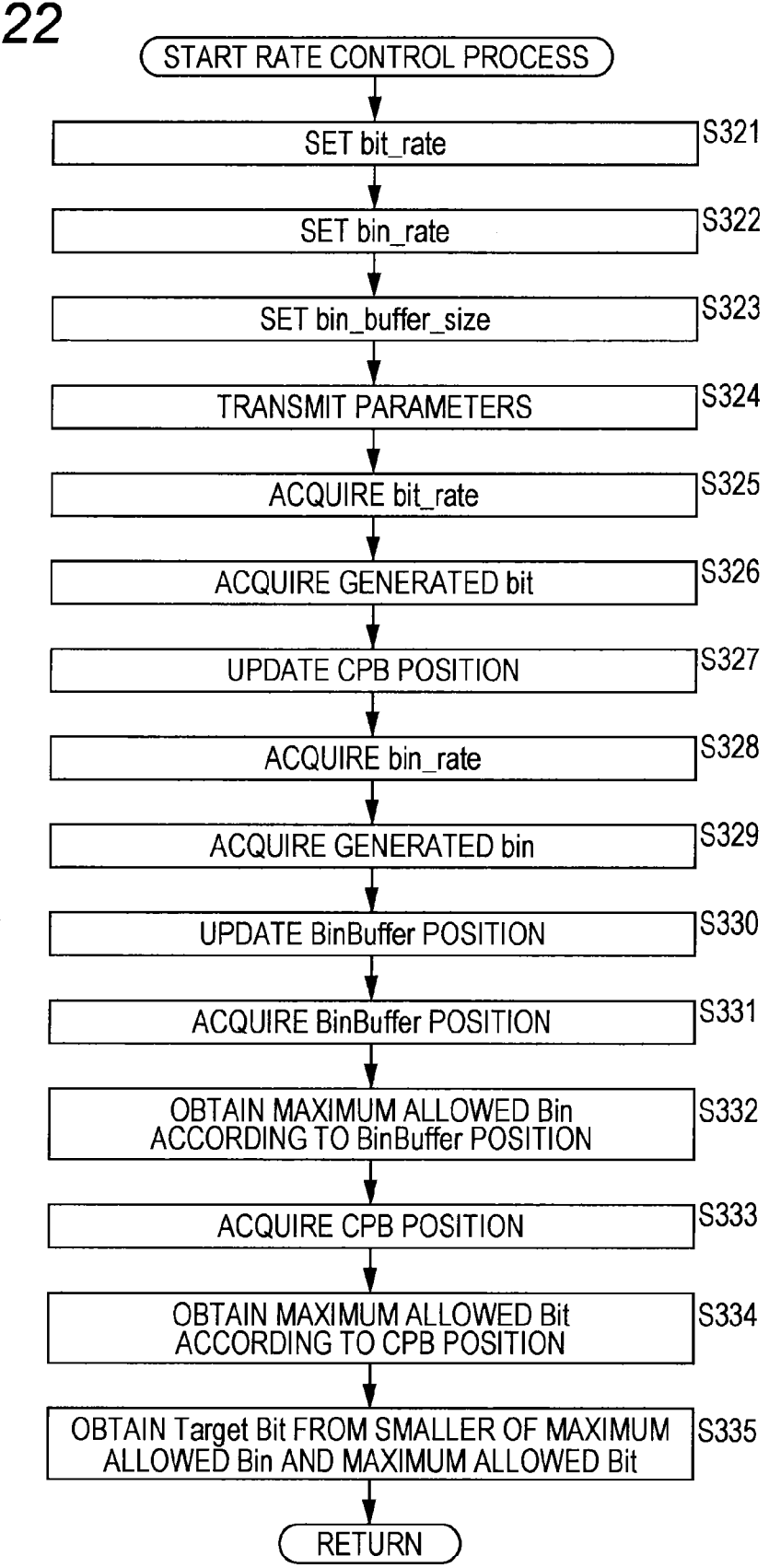
FIG. 22 is a flowchart for explaining another example of the flow of the rate control process.

An example of a flow of the rate control process in this case will be described with reference to the flowchart of FIG. 22. Note that the encoding process is performed similarly to the case of the first embodiment described with reference to the flowchart of FIG. 11.

When the rate control process is started, the bit_rate setting unit 321 sets bit_rate in step S321. In step S322, the bin_rate setting unit 322 sets bin_rate. In step S323, the bin_buffer_size setting unit 323 sets bin_buffer_sice.

In step S324, the parameter setting unit 311 supplies various parameters generated in steps S321 to S323 to the accumulation buffer 107 and transmits the parameters as syntax to the decoding side.

In step S325, the bit_rate acquiring unit 331 of the HRD tracing unit 312 acquires the bit_rate set in step S321. In step S326, the generated Bit acquiring unit 332 acquires the generated Bit. In step S327, the CPB position acquiring unit 333 updates the CPB position by using the bit_rate acquired in step S325 and the generated Bit acquired in step S326.

In step S328, the bin_rate acquiring unit 341 of the BinHRD tracing unit 313 acquires the bin_rate set in step S322. In step S329, the generated Bin acquiring unit 342 acquires the generated Bin. In step S330, the BinBuffer position updating unit 343 updates the BinBuffer position by using the bin_rate acquired in step S328 and the generated Bin acquired in step S329.

In step S331, the BinBuffer position acquiring unit 353 of the target bit determining unit 314 acquires the latest BinBuffer position updated in step S330. In step S332, the maximum allowed Bin calculating unit 354 obtains the maximum allowed Bin according to the latest BinBuffer position acquired in step S331.

In step S333, the CPB position acquiring unit 351 acquires the latest CPB position updated in step S327. In step S334, the maximum allowed Bit calculating unit 352 obtains maximum allowed Bit according to the latest CPB position acquired in step S333.

In step S335, the setting unit 355 obtains a target bit by using the smaller of the maximum allowed Bin obtained in step S332 and the maximum allowed Bit obtained in step S334, and supplies the target bit to the quantizer 105.

Figure 11:
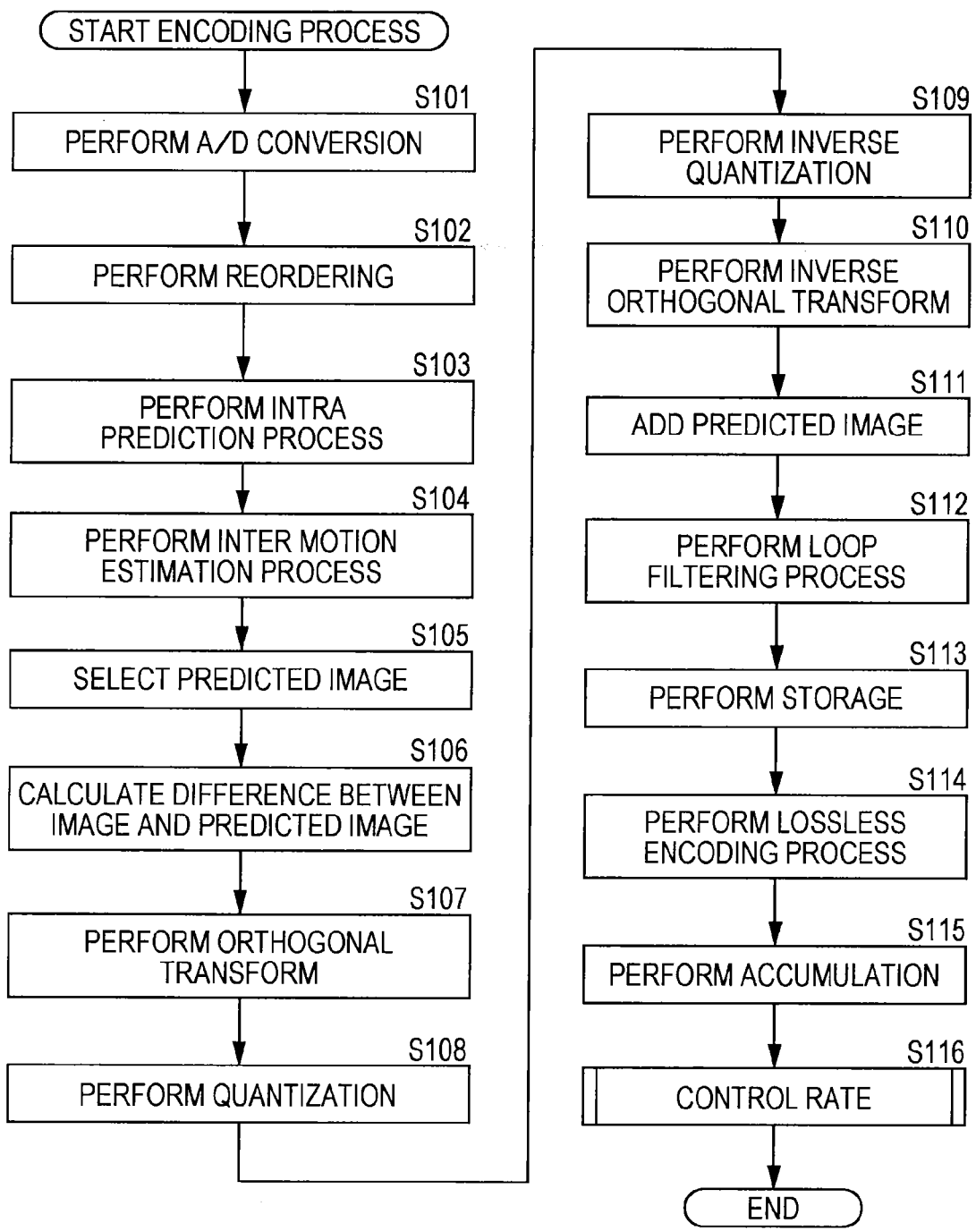
FIG. 11 is a flowchart for explaining an example of a flow of an encoding process.

When the processing in step S335 is terminated, the rate controller 117 terminates the rate control process and returns the process to FIG. 11.

As a result of performing the rate control process as described above, the rate controller 117 can perform rate control more easily.

Note that the structure of the image decoding device in this case is similar to the image decoding device 200 described with reference to FIG. 15. Furthermore, the structure of the lossless decoder is also similar to the lossless decoder 202 described with reference to FIG. 16 in which the decoding processor 233 only needs to operate similarly to the hypothetical decoder as described above according to parameters supplied from the image encoding device 100.

The present technique can be applied to image encoding devices and image decoding devices used for receiving image information (bit stream) compressed using orthogonal transform such as discrete cosine transform and motion compensation as in MPEG or H.26x, for example, via network media such as satellite broadcasting, cable television, the Internet, or portable telephone devices. The present technique can also be applied to image encoding devices and image decoding devices that are used when compressed image information is processed on a storage medium such as an optical or magnetic disk or a flash memory. Furthermore, the present technique can also be applied to motion estimator/compensator included in the image encoding devices, the image decoding devices, and the like.

4. Fourth Embodiment

[Personal Computer]

The series of processes described above can be performed either by hardware or by software. When the series of processes described above is performed by software, programs constituting the software are installed in a computer. Note that examples of the computer include a computer embedded in dedicated hardware and a general-purpose personal computer capable of executing various functions by installing various programs therein.

Figure 23:
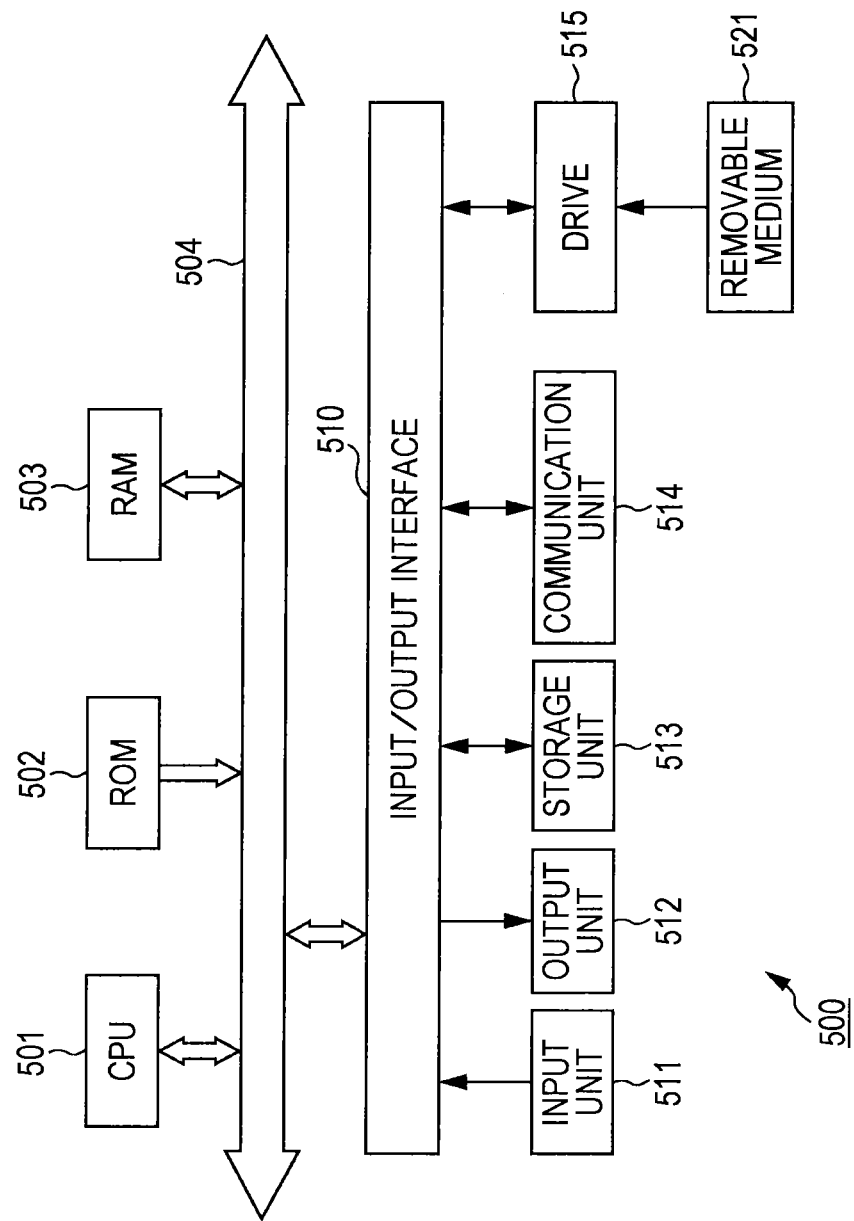
FIG. 23 is a block diagram showing a typical example structure of a personal computer.

In FIG. 23, a CPU (central processing unit) 501 of a personal computer 500 performs various processes according to programs stored in a ROM (read only memory) 502 or programs loaded onto a RAM (random access memory) 503 from a storage unit 513. The RAM 503 also stores data necessary for the CPU 501 to perform various processes and the like as necessary.

The CPU 501, the ROM 502, and the RAM 503 are connected to one another via a bus 504. An input/output interface 510 is also connected to the bus 504.

The input/output interface 510 has the following components connected thereto: an input unit 511 including a keyboard, a mouse, or the like; an output unit 512 including a display such as a CRT (cathode ray tube) or a LCD (liquid crystal display), and a speaker; the storage unit 513 including a hard disk or the like; and a communication unit 514 including a modem or the like. The communication unit 514 performs communications via networks including the Internet.

A drive 515 is also connected to the input/output interface 510 where necessary, a removable medium 521 such as a magnetic disk, an optical disk, a magnetooptical disk, or a semiconductor memory is mounted on the drive as appropriate, and a computer program read from such a removable disk is installed in the storage unit 513 where necessary.

When the above described series of processes is performed by software, the programs constituting the software are installed from a network or a recording medium.

As shown in FIG. 23, examples of the recording medium include the removable medium 521 that is distributed for delivering programs to users separately from the device, such as a magnetic disk (including a flexible disk), an optical disk (including a CD-ROM (compact disc-read only memory) or a DVD (digital versatile disc)), a magnetooptical disk (including an MD (mini disc)), and a semiconductor memory, which has programs recorded thereon, and alternatively, the ROM 502 having programs recorded therein and a hard disk included in the storage unit 513, which are incorporated beforehand into the device prior to delivery to users.

Programs to be executed by the computer may be programs for carrying out processes in chronological order in accordance with the sequence described in this specification, or programs for carrying out processes in parallel or at necessary timing such as in response to a call.

In this specification, steps describing programs to be recorded in a recording medium include processes to be performed in parallel or independently of one another if not necessarily in chronological order, as well as processes to be performed in chronological order in accordance with the sequence described herein.

In this specification, a system refers to the entirety of equipment including more than one device.

Furthermore, any structure described above as one device (or one processing unit) may be divided into two or more devices (or processing units). Conversely, any structure described above as two or more devices (or processing units) may be combined into one device (or processing unit). Furthermore, it is of course possible to add components other than those described above to the structure of any of the devices (or processing units). Furthermore, some components of a device (or processing unit) may be incorporated into the structure of another device (or processing unit) as long as the structure and the function of the system as a whole are substantially the same. That is, the present technique is not limited to the embodiments described above, but various modifications may be made thereto without departing from the scope of the technique.

The image encoding devices and the image decoding devices according to the embodiments described above can be applied to various electronic devices such as transmitters and receivers in satellite broadcasting, cable broadcasting such as cable TV, distribution via the Internet, distribution to terminals via cellular communication, or the like, recording devices configured to record images in media such as magnetic discs and flash memory, and reproduction devices configured to reproduce images from the storage media. Four examples of applications will be described below.

5. Fifth Embodiment

[First Application: Television Receiver]

Figure 24:
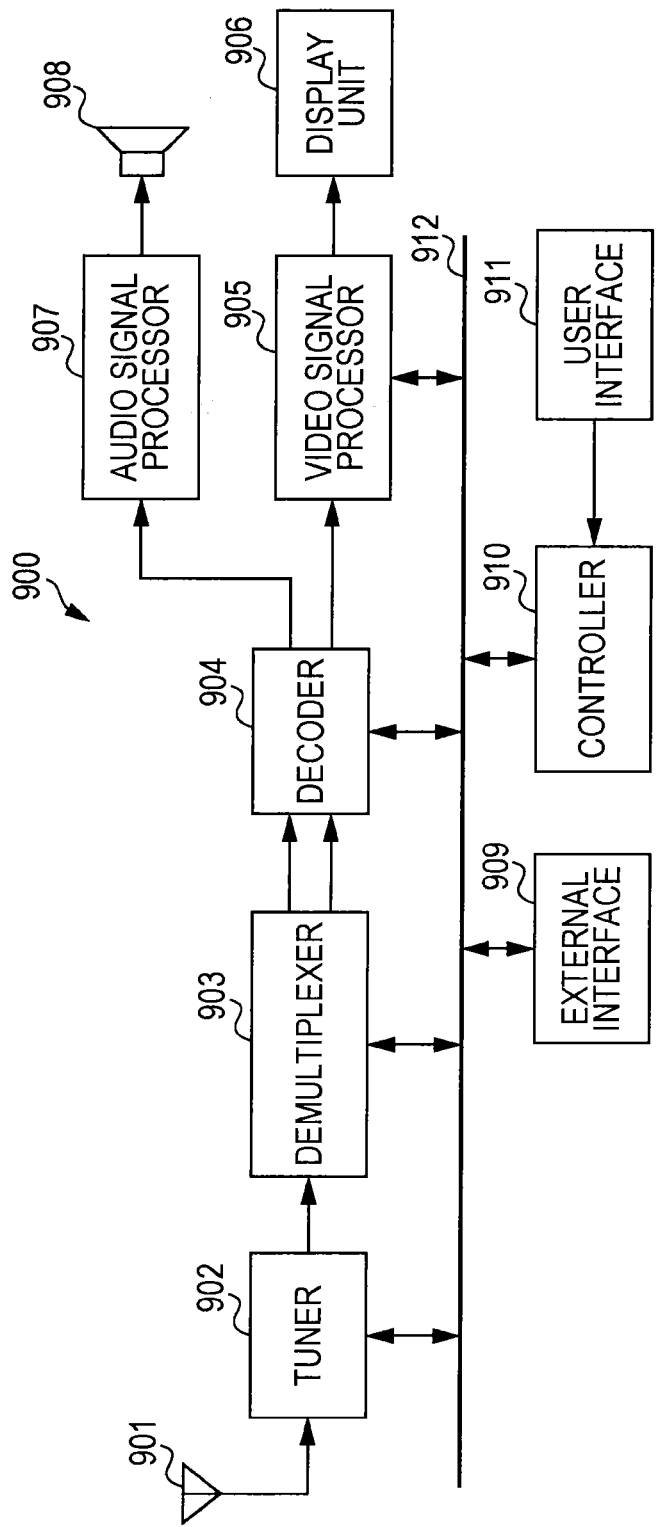
FIG. 24 is a block diagram showing one example of a schematic structure of a television apparatus.

FIG. 24 shows an example of a schematic structure of a television apparatus to which the embodiments described above are applied. The television apparatus 900 includes an antenna 901, a tuner 902, a demultiplexer 903, a decoder 904, a video signal processor 905, a display unit 906, an audio signal processor 907, a speaker 908, an external interface 909, a controller 910, a user interface 911, and a bus 912.

The tuner 902 extracts a signal of a desired channel from broadcast signals received via the antenna 901, and demodulates the extracted signal. The tuner 902 then outputs an encoded bit stream obtained by the demodulation to the demultiplexer 903. That is, the tuner 902 serves as transmitting means in the television apparatus 900 that receives an encoded stream of encoded images.

The demultiplexer 903 separates a video stream and an audio stream of a program to be viewed from the encoded bit stream, and outputs the separated streams to the decoder 904. The demultiplexer 903 also extracts auxiliary data such as an EPG (electronic program guide) from the encoded bit stream, and supplies the extracted data to the controller 910. If the encoded bit stream is scrambled, the demultiplexer 903 may descramble the encoded bit stream.

The decoder 904 decodes the video stream and the audio stream input from the demultiplexer 903. The decoder 904 then outputs video data generated by the decoding to the video signal processor 905. The decoder 904 also outputs audio data generated by the decoding to the audio signal processor 907.

The video signal processor 905 reproduces video data input from the decoder 904, and displays the video data on the display unit 906. The video signal processor 905 may also display an application screen supplied via the network on the display unit 906. Furthermore, the video signal processor 905 may perform additional processing such as noise removal on the video data depending on settings. The video signal processor 905 may further generate an image of a GUI (graphical user interface) such as a menu, a button or a cursor and superimpose the generated image on the output images.

The display unit 906 is driven by a drive signal supplied from the video signal processor 905, and displays video or images on a video screen of a display device (such as a liquid crystal display, a plasma display, or an OELD (organic electroluminescence display).

The audio signal processor 907 performs reproduction processing such as D/A conversion and amplification on the audio data input from the decoder 904, and outputs audio through the speaker 908. Furthermore, the audio signal processor 907 may perform additional processing such as noise removal on the audio data.

The external interface 909 is an interface for connecting the television apparatus 900 with an external device or a network. For example, a video stream or an audio stream received via the external interface 909 may be decoded by the decoder 904. That is, the external interface 909 also serves as transmitting means in the television apparatus 900 that receives an encoded stream of encoded images.

The controller 910 includes a processor such as a CPU, and a memory such as a RAM and a ROM. The memory stores programs to be executed by the CPU, program data, EPG data, data acquired via the network, and the like. Programs stored in the memory are read and executed by the CPU when the television apparatus 900 is activated, for example. The CPU controls the operation of the television apparatus 900 according to control signals input from the user interface 911, for example, by executing the programs.

The user interface 911 is connected to the controller 910. The user interface 911 includes buttons and switches for users to operate the television apparatus 900 and a receiving unit for receiving remote control signals, for example. The user interface 911 detects operation by a user via these components, generates a control signal, and outputs the generated control signal to the controller 910.

The bus 912 connects the tuner 902, the demultiplexer 903, the decoder 904, the video signal processor 905, the audio signal processor 907, the external interface 909, and the controller 910 to one another.

In the television apparatus 900 having such a structure, the decoder 904 has the functions of the image decoding devices according to the embodiments described above. As a result, the rate can be controlled more easily in decoding of images in the television apparatus 900.

6. Sixth Embodiment

[Second Application: Portable Telephone Device]

Figure 25:
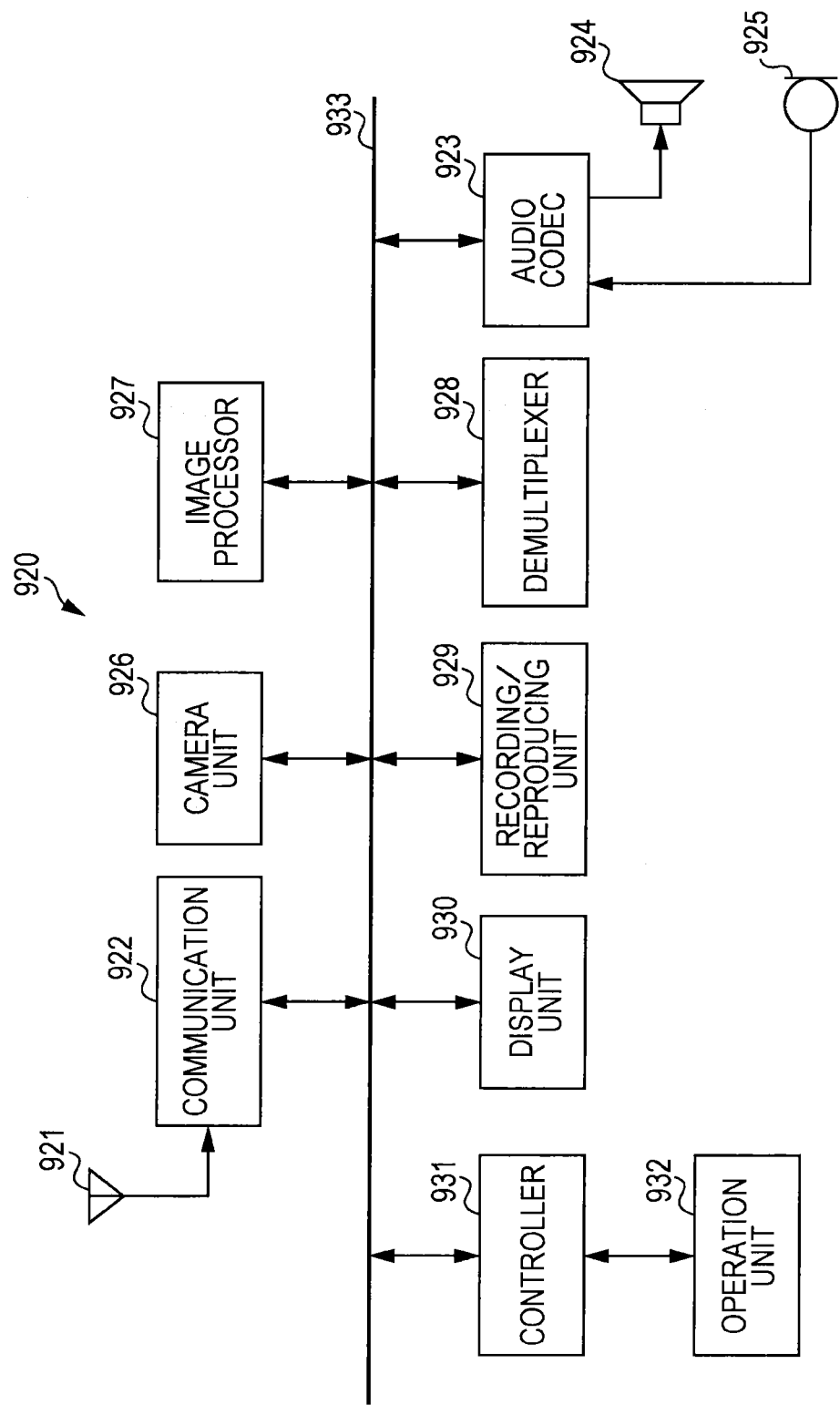
FIG. 25 is a block diagram showing one example of a schematic structure of a portable telephone device.

FIG. 25 shows an example of a schematic structure of a portable telephone device to which the embodiments described above are applied. The portable telephone device 920 includes an antenna 921, a communication unit 922, an audio codec 923, a speaker 924, a microphone 925, a camera unit 926, an image processor 927, a demultiplexer 928, a recording/reproducing unit 929, a display unit 930, a controller 931, an operation unit 932, and a bus 933. The portable telephone device 920 may be a typical portable telephone device, or may be a portable information terminal having a phone call function like what is called a smart phone.

The antenna 921 is connected to the communication unit 922. The speaker 924 and the microphone 925 are connected to the audio codec 923. The operation unit 932 is connected to the controller 931. The bus 933 connects the communication unit 922, the audio codec 923, the camera unit 926, the image processor 927, the demultiplexer 928, the recording/reproducing unit 929, the display unit 930, and the controller 931 to one another.

The portable telephone device 920 performs operation such as transmission/reception of audio signals, transmission/reception of electronic mails and image data, capturing of images, recording of data, and the like in various operation modes including a voice call mode, a data communication mode, an imaging mode, and a video telephone mode. The portable telephone device 920 can execute various applications by storing and executing software programs acquired through data communication or by reading out the programs from a removable medium, for example (application execution mode).

In the voice call mode, an analog audio signal generated by the microphone 925 is supplied to the audio codec 923. The audio codec 923 converts the analog audio signal to audio data, performs A/D conversion on the converted audio data, and compresses the audio data. The audio codec 923 then outputs the audio data resulting from the compression to the communication unit 922. The communication unit 922 encodes and modulates the audio data to generate a signal to be transmitted. The communication unit 922 then transmits the generated signal to be transmitted to a base station (not shown) via the antenna 921. The communication unit 922 also amplifies and performs frequency conversion on a radio signal received via the antenna 921 to obtain a received signal. The communication unit 922 then demodulates and decodes the received signal to generate audio data, and outputs the generated audio data to the audio codec 923. The audio codec 923 decompresses and performs D/A conversion on the audio data to generate an analog audio signal. The audio codec 923 then supplies the generated audio signal to the speaker 924 to output audio therefrom.

In the data communication mode, the controller 931 generates text data to be included in an electronic mail according to operation by a user via the operation unit 932, for example. The controller 931 also displays the text on the display unit 930. The controller 931 also generates electronic mail data in response to an instruction for transmission from a user via the operation unit 932, and outputs the generated electronic mail data to the communication unit 922. The communication unit 922 encodes and modulates the electronic mail data to generate a signal to be transmitted. The communication unit 922 then transmits the generated signal to be transmitted to a base station (not shown) via the antenna 921. The communication unit 922 also amplifies and performs frequency conversion on a radio signal received via the antenna 921 to obtain a received signal. The communication unit 922 then demodulates and decodes the received signal to restore electronic mail data, and outputs the restored electronic mail data to the controller 931. The controller 931 displays the content of the electronic mail on the display unit 930 and stores the electronic mail data into a storage medium of the recording/reproducing unit 929.

The recording/reproducing unit 929 includes a readable/writable storage medium. For example, the storage medium may be an internal storage medium such as a RAM or flash memory, or may be an externally mounted storage medium such as a hard disk, a magnetic disk, a magnetooptical disk, a USB (unallocated space bitmap) memory, or a memory card.

In the imaging mode, the camera unit 926 images a subject to generate image data, and outputs the generated image data to the image processor 927, for example. The image processor 927 encodes the image data input from the camera unit 926, and stores an encoded stream in the storage medium of the storage/reproducing unit 929.

In the video telephone mode, the demultiplexer 928 multiplexes a video stream encoded by the image processor 927 and an audio stream input from the audio codec 923, and outputs the multiplexed stream to the communication unit 922, for example. The communication unit 922 encodes and modulates the stream to generate a signal to be transmitted. The communication unit 922 then transmits the generated signal to be transmitted to a base station (not shown) via the antenna 921. The communication unit 922 also amplifies and performs frequency conversion on a radio signal received via the antenna 921 to obtain a received signal. The signal to be transmitted and the received signal may include encoded bit streams. The communication unit 922 then demodulates and decodes the received signal to restore the stream and outputs the restored stream to the demultiplexer 928. The demultiplexer 928 separates a video stream and an audio stream from the input stream, and outputs the video stream to the image processor 927 and the audio stream to the audio codec 923. The image processor 927 decodes the video stream to generate video data. The video data is supplied to the display unit 930, and a series of images is displayed by the display unit 930. The audio codec 923 decompresses and performs D/A conversion on the audio stream to generate an analog audio signal. The audio codec 923 then supplies the generated audio signal to the speaker 924 to output audio therefrom.

Furthermore, in the application execution mode, the controller 931 reads out and executes a software program stored in the recording/reproducing unit 929 or the like on the basis of an instruction from a user received by the operation unit 932, for example. As a result, an application is executed and, as necessary, image processing is performed by the image processor 927, images are displayed by the display unit 920, an image input is received by the camera unit 926, audio is output from the speaker 924, an audio input is received by the microphone 925, data is recorded into the recording/reproducing unit 929, data is read out from the recording/reproducing unit 929, or communication with another device is performed via the communication unit 922.

In the portable telephone device 920 having such a structure, the image processor 927 has the functions of the image encoding devices and the image decoding devices according to the embodiments described above. As a result, rate control can be performed more easily in encoding and decoding of images in the portable telephone device 920.

7. Seventh Embodiment

[Third Application: Recording/Reproducing Device]

Figure 26:
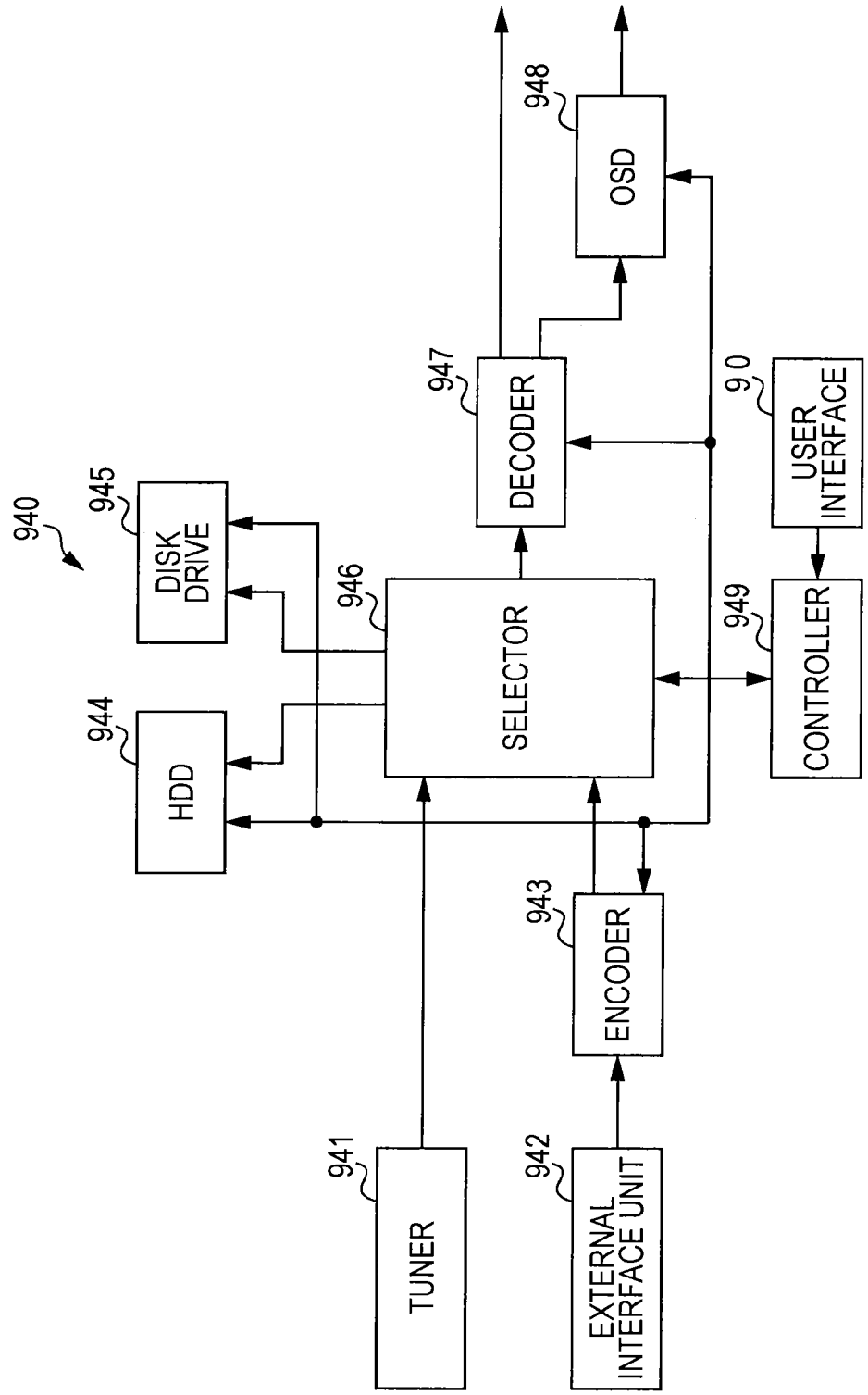
FIG. 26 is a block diagram showing one example of a schematic structure of a recording/reproducing device.

FIG. 26 shows an example of a schematic structure of a recording/reproducing device to which the embodiments described above are applied. The recording/reproducing device 940 encodes audio data and video data of a received broadcast program and records the encoded data into a recording medium, for example. The recording/reproducing device 940 may also encode audio data and video data acquired from another device and record the encoded data into a recording medium, for example. The recording/reproducing device 940 also reproduces data recorded in the recording medium on a monitor and through a speaker in response to an instruction from a user, for example. In this case, the recording/reproducing device 940 decodes audio data and video data.

The recording/reproducing device 940 includes a tuner 941, an external interface 942, an encoder 943, an HDD (hard disk drive) 944, a disk drive 945, a selector 946, a decoder 947, an OSD (on-screen display) 948, a controller 949, and a user interface 950.

The tuner 941 extracts a signal of a desired channel from broadcast signals received via an antenna (not shown), and demodulates the extracted signal. The tuner 941 then outputs an encoded bit stream obtained by the demodulation to the selector 946. That is, the tuner 941 has a role as transmission means in the recording/reproducing device 940.

The external interface 942 is an interface for connecting the recording/reproducing device 940 with an external device or a network. The external interface 942 may be an IEEE 1394 interface, a network interface, a USB interface, or a flash memory interface, for example. For example, video data and audio data received via the external interface 942 are input to the encoder 943. That is, the external interface 942 has a role as transmission means in the recording/reproducing device 940.

The encoder 943 encodes the video data and the audio data if the video data and the audio data input from the external interface 942 are not encoded. The encoder 943 then outputs the encoded bit stream to the selector 946.

The HDD 944 records an encoded bit stream of compressed content data such as video and audio, various programs and other data in an internal hard disk. The HDD 944 also reads out the data from the hard disk for reproduction of video and audio.

The disk drive 945 records and reads out data into/from a recording medium mounted thereon. The recording medium mounted on the disk drive 945 may be a DVD disk (such as a DVD-Video, a DVD-RAM, a DVD-R, a DVD-RW, a DVD+R, or a DVD+RW) or a Blu-ray (registered trademark) disc, for example.

For recording video and audio, the selector 946 selects an encoded bit stream input from the tuner 941 or the encoder 943 and outputs the selected encoded bit stream to the HDD 944 or the disk drive 945. For reproducing video and audio, the selector 946 selects an encoded bit stream input from the HDD 944 or the disk drive 945 to the decoder 947.

The decoder 947 decodes the encoded bit stream to generate video data and audio data. The decoder 947 then outputs the generated video data to the OSD 948. The decoder 904 also outputs the generated audio data to an external speaker.

The OSD 948 reproduces the video data input from the decoder 947 and displays the video. The OSD 948 may also superimpose a GUI image such as a menu, a button or a cursor on the video to be displayed.

The controller 949 includes a processor such as a CPU, and a memory such as a RAM and a ROM. The memory stores programs to be executed by the CPU, program data, and the like. Programs stored in the memory are read and executed by the CPU when the recording/reproducing device 940 is activated, for example. The CPU controls the operation of the recording/reproducing device 940 according to control signals input from the user interface 950, for example, by executing the programs.

The user interface 950 is connected to the controller 949. The user interface 950 includes buttons and switches for users to operate the recording/reproducing device 940 and a receiving unit for receiving remote control signals, for example. The user interface 950 detects operation by a user via these components, generates a control signal, and outputs the generated control signal to the controller 949.

In the recording/reproducing device 940 having such a structure, the encoder 943 has the functions of the image encoding devices according to the embodiments described above. Furthermore, the decoder 947 has the functions of the image decoding devices according to the embodiments described above. As a result, rate control can be performed more easily in encoding and decoding of images in the recording/reproducing device 940.

8. Eighth Embodiment

[Fourth Application: Imaging Device]

Figure 27:
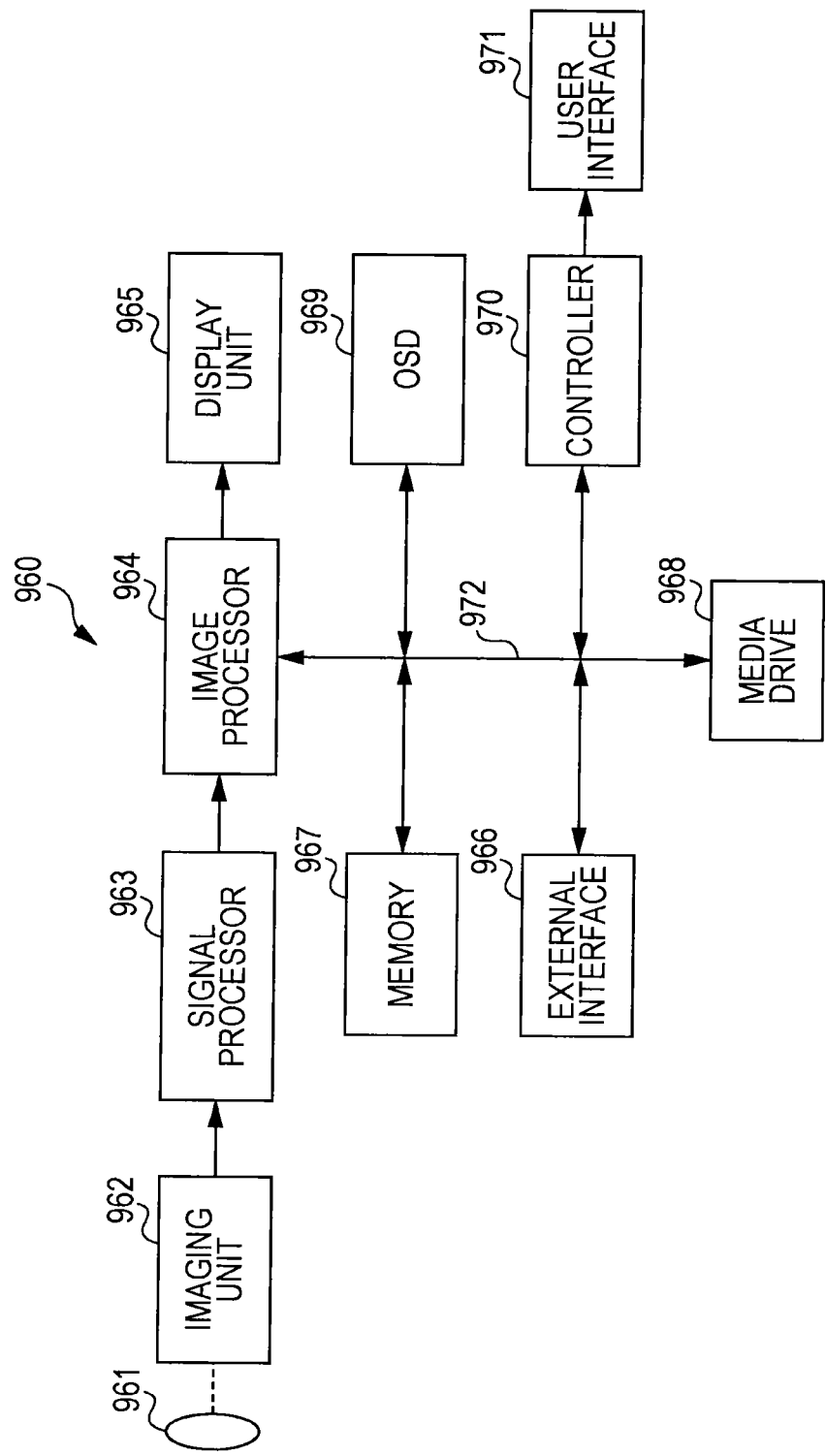
FIG. 27 is a block diagram showing one example of a schematic structure of an imaging device.

FIG. 27 shows one example of a schematic structure of an imaging device to which the embodiments described above are applied. The imaging device 960 images a subject to generate an image, encodes the image data, and records the encoded image data in a recording medium.

The imaging device 960 includes an optical block 961, an imaging unit 962, a signal processor 963, an image processor 964, a display unit 965, an external interface 966, a memory 967, a media drive 968, an OSD 969, a controller 970, a user interface 971, and a bus 972.

The optical block 961 is connected to the imaging unit 962. The imaging unit 962 is connected to the signal processor 963. The display unit 965 is connected to the image processor 964. The user interface 971 is connected to the controller 970. The bus 972 connects the image processor 964, the external interface 966, the memory 967, the media drive 968, the OSD 969, and the controller 970 to one another.

The optical block 961 includes a focus lens, a diaphragm, and the like. The optical block 961 forms an optical image of a subject on the imaging surface of the imaging unit 962. The imaging unit 962 includes an image sensor such as a CCD (charge coupled device) or a CMOS (complementary metal oxide semiconductor), and converts the optical image formed on the imaging surface into an image signal that is an electric signal through photoelectric conversion. The imaging unit 962 then outputs the image signal to the signal processor 963.

The signal processor 963 performs various kinds of camera signal processing such as knee correction, gamma correction, and color correction on the image signal input from the imaging unit 962. The signal processor 963 outputs image data subjected to the camera signal processing to the image processor 964.

The image processor 964 encodes the image data input from the signal processor 963 to generate encoded data. The image processor 964 then outputs the generated encoded data to the external interface 966 or the media drive 968. The image processor 964 also decodes encoded data input from the external interface 966 or the media drive 968 to generate image data. The image processor 964 then outputs the generated image data to the display unit 965. The image processor 964 may output image data input from the signal processor 963 to the display unit 965 to display images. The image processor 964 may also superimpose data for display acquired from the OSD 969 on the images to be output to the display unit 965.

The OSD 969 may generate a GUI image such as a menu, a button or a cursor and output the generated image to the image processor 964, for example.

The external interface 966 is a USB input/output terminal, for example. The external interface 966 connects the imaging device 960 and a printer for printing of an image, for example. In addition, a drive is connected to the external interface 966 as necessary. A removable medium such as a magnetic disk or an optical disk is mounted to the drive, for example, and a program read out from the removable medium can be installed in the imaging device 960. Furthermore, the external interface 966 may be a network interface connected to a network such as a LAN or the Internet. That is, the external interface 966 has a role as transmission means in the imaging device 960.

The recording medium to be mounted on the media drive 968 may be a readable/writable removable medium such as a magnetic disk, a magnetooptical disk, an optical disk or a semiconductor memory. Alternatively, a recording medium may be mounted on the media drive 968 in a fixed manner to form an immobile storage unit such as an internal hard disk drive or an SSD (solid state drive), for example.

The controller 970 includes a processor such as a CPU, and a memory such as a RAM and a ROM. The memory stores programs to be executed by the CPU, program data, and the like. Programs stored in the memory are read and executed by the CPU when the imaging device 960 is activated, for example. The CPU controls the operation of the imaging device 960 according to control signals input from the user interface 971, for example, by executing the programs.

The user interface 971 is connected with the controller 970. The user interface 971 includes buttons and switches for users to operate the imaging device 960, for example. The user interface 971 detects operation by a user via these components, generates a control signal, and outputs the generated control signal to the controller 970.

In the imaging device 960 having such a structure, the image processor 964 has the functions of the image encoding devices and the image decoding devices according to the embodiments described above. As a result, rate control can be performed more easily in encoding and decoding of images in the imaging device 960.

In this specification, examples in which various information pieces such as difference quantized parameters are multiplexed with the encoded stream and transmitted from the encoding side to the decoding side have been described. The method in which the information pieces are transmitted, however, is not limited to these examples. For example, the information pieces may be transmitted or recorded as separate data associated with the encoded bit stream without being multiplexed with the encoded bit stream. Note that the term "associate" means to allow images (which may be part of images such as slices or blocks) contained in a bit stream to be linked with information on the images in decoding. That is, the information may be transmitted via a transmission path different from that for the images (or bit stream). Alternatively, the information may be recorded in a recording medium other than that for the images (or bit stream) (or on a different area of the same recording medium). Furthermore, the information and the images (or bit stream) may be associated with each other in any units such as in units of some frames, one frame or part of a frame.

While preferred embodiments of the present disclosure have been described above with reference to the accompanying drawings, the present disclosure is not limited to these examples. It is apparent that a person ordinary skilled in the art to which the present disclosure belongs can conceive various variations and modifications within the technical idea described in the claims, and it is naturally appreciated that these variations and modification belongs within the technical scope of the present disclosure.

The stream, the bit stream, the code stream, the encoded stream and the encoded bit stream all refer to encoded data (generated by the image encoding device and) output by the image encoding device. That is, these terms may have different meanings from one another in a narrow sense but basically have the same meaning unless otherwise explained. The encoded stream may contain any data such as VCL (video coding layer) NAL (network abstraction layer) units, Filler Data NAL units, and Non VCL NAL units. For example, the encoded stream may be a bit stream or a byte stream. The video stream is a stream of data relating to video, and the audio stream is a stream relating to audio. The video stream and the audio stream are contained in the encoded stream.

Furthermore, parameters include flags in the description above.

The present technique can also have the following structures.

(1) An image processing device including:
a setting unit configured to set a binary parameter used for defining a hypothetical decoder defined in an encoded stream in binary data;
an encoding unit configured to encode image data to generate an encoded stream; and
a transmitting unit configured to transmit the binary parameter set by the setting unit and the encoded stream generated by the encoding unit.

(2) The image processing device of (1), wherein the setting unit sets a size of a buffer of the hypothetical decoder and a position representing a data amount of data accumulated in the buffer as the binary parameter.

(3) The image processing device of (1) or (2), wherein the setting unit sets a conversion parameter used for converting a code amount of the encoded stream into a data amount of the binary data as the binary parameter.

(4) The image processing device of (3), wherein the setting unit sets as the binary parameter a parameter indicating whether to convert the hypothetical decoder from definition by the encoded stream to definition by binary data by using the conversion parameter.

(5) The image processing device of any one of (1) to (4), wherein the setting unit sets as the binary parameter a parameter indicating whether to set a hypothetical decoder defined in the encoded stream and a hypothetical decoder defined in binary data by using different parameters.

(6) The image processing device of any one of (1) to (5), wherein the transmitting unit transmits the binary parameter as additional information of the encoded stream generated by the encoding unit.

(7) The image processing device of any one of (1) to (5), wherein the transmitting unit transmits the binary parameter by inserting the binary parameter into the encoded stream generated by the encoding unit.

(8) The image processing device of (1), wherein the setting unit sets as the binary parameter a parameter used for defining a hypothetical decoder defining a binary data processing rate.

(9) The image processing device of (8), wherein the setting unit sets as the binary parameter a parameter indicating the binary data processing rate.

(10) The image processing device of (8) or (9), wherein the setting unit sets as the binary parameter a parameter indicating a size of a buffer of the hypothetical decoder.

(11) The image processing device of any one of (8) to (10), further including a determining unit configured to determine a target bit that is a target rate of an encoded stream by using a maximum processing amount of the encoded stream and a maximum processing amount of binary data determined according to the binary parameter.

(12) An image processing method for an image processing device, the method including:
setting a binary parameter used for defining a hypothetical decoder defined in an encoded stream in binary data by a setting unit;
encoding image data to generate an encoded stream by an encoding unit; and
transmitting the set binary parameter and the generated encoded stream by a transmitting unit.

(13) An image processing device including:
a receiving unit configured to receive a binary parameter used for defining a hypothetical decoder defined in an encoded stream in binary data and an encoded stream obtained by encoding image data; and a decoding unit configured to decode the encoded stream received by the receiving unit by using the binary parameter received by the receiving unit.

(14) An image processing method for an image processing device, the method including:
receiving a binary parameter used for defining a hypothetical decoder defined in an encoded stream in binary data and an encoded stream obtained by encoding image data by a receiving unit; and
decoding the received encoded stream by using the received binary parameter by a decoding unit.

REFERENCE SIGNS LIST

100 image encoding device, 105 quantizer, 106 lossless encoder, 107 accumulation buffer, 117 rate controller, 161 parameter setting unit, 162 HRD tracing unit, 163 CPB position converting unit, 164 target bit determining unit, 200 image decoding device, 201 accumulation buffer, 202 lossless decoder, 203 inverse quantizer, 231 parameter acquiring unit, 232 code stream acquiring unit, 233 decoding processor, 311 parameter setting unit, 312 HRD tracing unit, 313 BinHRD tracing unit, 314 target bit determining unit

The invention claimed is:

1. An image processing device, comprising:
at least one processor configured to:
set a binary parameter that defines a decoder indicated in an encoded stream of binary data, wherein the binary data is obtained by binarization of quantized data;
arithmetic code the binary data to generate the encoded stream; and
transmit the set binary parameter and the encoded stream,
wherein the set binary parameter indicates a conversion parameter used to convert a code amount of the encoded stream into a data amount of the binary data, and
wherein the set binary parameter further indicates whether to convert the decoder from a definition by the encoded stream to a definition by the binary data based on the conversion parameter.

2. The image processing device according to claim 1, wherein the at least one processor is further configured to set a size of a buffer of the decoder and a position representing a data amount of data accumulated in the buffer as the binary parameter.

3. The image processing device according to claim 1, wherein the set binary parameter further indicates whether to set the decoder defined in the encoded stream and the decoder defined in the binary data based on different parameters.

4. The image processing device according to claim 1, wherein the at least one processor is further configured to transmit the binary parameter as additional information of the generated encoded stream.

5. The image processing device according to claim 1, wherein the at least one processor is further configured to transmit the binary parameter based on an insertion of the binary parameter into the generated encoded stream.

6. The image processing device according to claim 1, wherein the binary parameter defines a binary data processing rate of the decoder.

7. The image processing device according to claim 6, wherein the binary data processing rate indicates a rate at which the binary data is read out from the decoder.

8. The image processing device according to claim 6,
wherein the binary parameter indicates a size of a buffer of the decoder.

9. The image processing device according to claim 6,
wherein the at least one processor is further configured to determine a target bit based on a first maximum processing amount of the encoded stream and a second maximum processing amount of the binary data,
wherein the target bit indicates a rate of the encoded stream, and
wherein the first maximum processing amount and the second maximum processing amount are determined based on the binary parameter.

10. An image processing method for an image processing device, the method comprising:
setting, by at least one processor, a binary parameter that defines a decoder indicated in an encoded stream of binary data, wherein the binary data is obtained by binarizing quantized data;
arithmetic coding, by at least one processor, the binary data to generate the encoded stream; and
transmitting, by the at least one processor, the set binary parameter and the generated encoded stream,
wherein the set binary parameter indicates a conversion parameter used for converting a code amount of the encoded stream into a data amount of the binary data, and
wherein the set binary parameter further indicates whether to convert the decoder from a definition by the encoded stream to a definition by the binary data based on the conversion parameter.

11. An image processing device, comprising:
at least one processor configured to:
receive a binary parameter,
wherein the binary parameter defines a decoder indicated in an encoded stream of binary data,
wherein the binary data is obtained by a binarization of quantized data, and
wherein the binary data is arithmetic coded to obtain the encoded stream; and
decode the received encoded stream based on the received binary parameter,
wherein the received binary parameter indicates a conversion parameter used to convert a code amount of the encoded stream into a data amount of the binary data, and
wherein the received binary parameter further indicates whether to convert the decoder from a definition by the encoded stream to a definition by the binary data based on the conversion parameter.

12. An image processing method for an image processing device, comprising:
receiving, by at least one processor, a binary parameter,
wherein the binary parameter defines a decoder indicated in an encoded stream of binary data,
wherein the binary data is obtained by binarizing quantized data, and
wherein the encoded stream is obtained by arithmetic coding of the binary data; and
decoding, by the at least one processor, the received encoded stream based on the received binary parameter,
wherein the received binary parameter indicates a conversion parameter used for converting a code amount of the encoded stream into a data amount of the binary data, and
wherein the received binary parameter further indicates whether to convert the decoder from a definition by the encoded stream to a definition by the binary data based on the conversion parameter.

13. The image processing device according to claim 1, wherein the binary parameter corresponds to a ratio of a first bit rate of the decoder defined in the encoded stream, to a second bit rate of the decoder defined in the binary data.

* * * * *